(12) United States Patent
Okegawa et al.

(10) Patent No.: US 8,897,621 B2
(45) Date of Patent: Nov. 25, 2014

(54) IMAGING APPARATUS, IMAGE PROCESSING APPARATUS, IMAGE PROCESSING METHOD, AND PROGRAM

(75) Inventors: Shuji Okegawa, Chiba (JP); Hirokazu Nakaya, Saitama (JP); Takahiro Tokuda, Tokyo (JP)

(73) Assignee: Sony Corporation (JP)

( * ) Notice: Subject to any disclaimer, the term of this patent is extended or adjusted under 35 U.S.C. 154(b) by 303 days.

(21) Appl. No.: 13/324,016

(22) Filed: Dec. 13, 2011

(65) Prior Publication Data

US 2012/0162357 A1  Jun. 28, 2012

(30) Foreign Application Priority Data

Dec. 22, 2010 (JP) ................ P2010-286200

(51) Int. Cl.
- *G11B 27/00* (2006.01)
- *H04N 5/93* (2006.01)
- *H04N 13/00* (2006.01)
- *H04N 13/02* (2006.01)
- *H04N 13/04* (2006.01)
- *H04N 5/225* (2006.01)

(52) U.S. Cl.
USPC ............ 386/280; 386/278; 348/42; 348/47; 348/48; 348/49; 348/50; 348/51; 348/54; 348/169

(58) Field of Classification Search
CPC ............ H04N 9/87; H04N 19/00169; H04N 2005/4407; H04N 21/24; H04N 21/4117; H04N 21/4722; H04N 21/4725; H04N 21/4728; H04N 5/33; H04N 5/4403; G06T 2207/30108; G06T 7/001
USPC ............ 348/42, 47, 48, 49, 50, 51, 54, 169; 386/278, 280
See application file for complete search history.

(56) References Cited

U.S. PATENT DOCUMENTS

| 6,157,018 A | 12/2000 | Ishiguro et al. |
| 6,375,366 B1 | 4/2002 | Kato et al. |
| 6,762,789 B1 * | 7/2004 | Sogabe et al. ............. 348/36 |

(Continued)

FOREIGN PATENT DOCUMENTS

| EP | 1589478 A2 | 10/2005 |
| JP | 2000-131738 A | 5/2000 |
| JP | 2000261705 A | 9/2000 |

OTHER PUBLICATIONS

"Appendix B" In: I. Potucek: "Omni-directional image processing for human detection and tracking" 2006, Brno University of Technology, Czech Republic. XP 002670592.

(Continued)

*Primary Examiner* — Daquan Zhao
(74) *Attorney, Agent, or Firm* — Lerner, David, Littenberg, Krumholz & Mentlik, LLP

(57) ABSTRACT

An imaging apparatus includes an imaging portion that images an omnidirectional subject on the basis of an imaging position when imaging is performed and generates a circular image including the omnidirectional subject, an image processing portion that specifies a substantially fan-shaped object region in a circular image which is generated on the basis of a direction specified based on an attitude of an imaging apparatus in the imaging position among all directions and converts an image of the object region into a substantially rectangular image, and a display control portion that simultaneously displays a conversion image which is the converted image and the generated circular image on a display portion.

10 Claims, 19 Drawing Sheets

(56) References Cited

U.S. PATENT DOCUMENTS

| | | | |
|---|---|---|---|
| 7,479,979 B2* | 1/2009 | Kakou et al. | 348/143 |
| 2005/0099500 A1* | 5/2005 | Fujita | 348/207.99 |
| 2008/0122922 A1* | 5/2008 | Geng | 348/39 |
| 2009/0207246 A1* | 8/2009 | Inami et al. | 348/135 |
| 2010/0002070 A1 | 1/2010 | Ahiska | |
| 2011/0115879 A1* | 5/2011 | Homma et al. | 348/36 |

OTHER PUBLICATIONS

Onoe Y et al: "Visual Surveillance and Monitoring System Using an Omnidirectional Video Camera", Pattern Recognition, 1998. Proceedings. Fourteenth International Conference on Brisbane, Qld., Australia Aug. 16-20,1998, Los Alamitos, CA, USA, IEEE Comput. Soc US. vol. 1, Aug. 16, 1998, pp. 588-592, XP 010297598.

Kopilovic I. et al: "Application of Panoramic Annular Lens for Motion Analysis Tasks: Surveillance and Smoke Detection", Pattern Recognition, 2000, Proceedings. 15th International Conference on September 3-7, 2000; Los Alamitos, CA, USA, IEEE Comput.Soc, US, vol. 4, Sep. 3, 2000, pp. 714-717 XP 010533178.

Gardel A et al: "Correction of Omnidirectional Camera Images using Reconfigurable Hardware" IEEE Industrial Electronics, IECON 2006—32nd Annual Conference on, IEEE, Piscataway, NJ, USA. Nov. 1, 2006, pp. 3403-3407, XP 031077386.

European Search Report EP 11192797, dated Mar. 12, 2012.

* cited by examiner

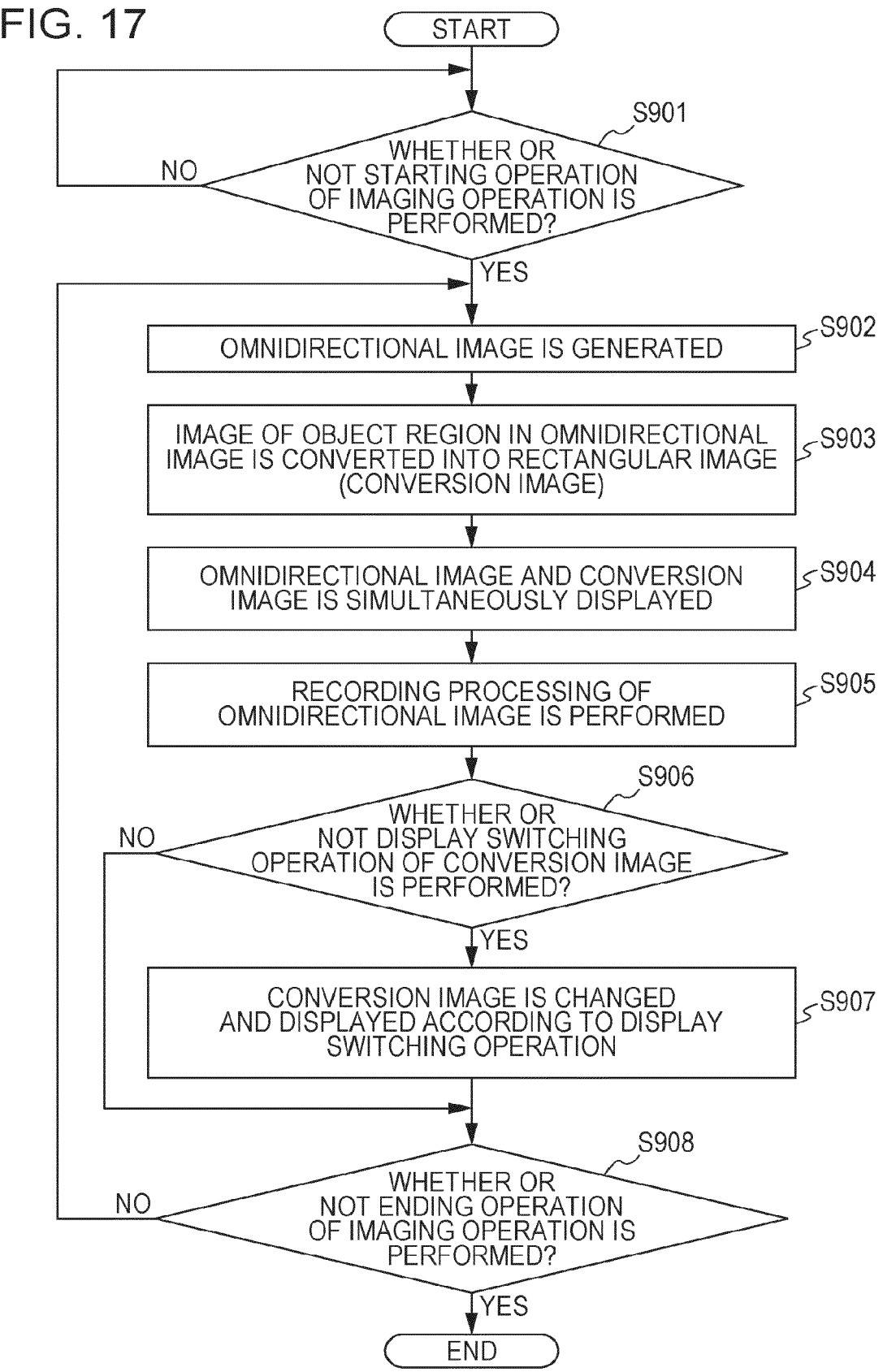

ND PROGRAM

IMAGING APPARATUS, IMAGE PROCESSING APPARATUS, IMAGE PROCESSING METHOD, AND PROGRAM

CROSS-REFERENCE TO RELATED APPLICATION

The present application claims priority from Japanese Patent Application No. JP 2010-286200 filed in the Japanese Patent Office on Dec. 22, 2010, the entire content of which is incorporated herein by reference.

BACKGROUND

The present disclosure relates to an imaging apparatus, and particularly, to an imaging apparatus, an image processing apparatus, an image processing method, and a program which causes a computer to execute the method for performing an image processing with respect to an omnidirectional image.

In recent years, imaging apparatuses such as a digital still camera or a digital video camera (camera integrated recorder), in which an image (image data) is generated by imaging subjects such as a landscape and the generated image is record as an image file (image content item), have become widespread. In addition, an imaging apparatus which generates an image including a relatively wide range of subjects has been suggested. For example, an imaging apparatus which images an omnidirectional subject and generates an omnidirectional image (image including the omnidirectional subject) has been suggested.

For example, an imaging apparatus capable of imaging an omnidirectional (360°) subject by using an omnidirectional imaging optical system including a reflective surface having a rotationally symmetrical shape is suggested (for example, refer to Japanese Unexamined Patent Application Publication No. 2000-131738).

SUMMARY

In the related art, due to the fact that the omnidirectional subject can be imaged, for example, the omnidirectional image (annular image or circular image) can be generated.

In addition, recording the omnidirectional image by making an adaptor (adaptor including the omnidirectional imaging optical system) for generating the omnidirectional image detachable and mounting the adaptor on the imaging apparatus is also assumed. Moreover, a case is assumed where the adaptor is mounted on the imaging apparatus and the imaging operation of the omnidirectional image is performed. When a user confirms the captured image (omnidirectional image) while performing the imaging operation, it is considered that user confirms by viewing the omnidirectional image (for example, annular image or circular image).

However, the image (for example, image including the subject in an optical axis direction) which is displayed at the time of performing a normal imaging operation and the omnidirectional image which displayed at the time of performing the imaging operation of the omnidirectional image are different from each other in the imaging range. Thereby, for example, it is assumed that it is difficult for a user accustomed to the normal imaging operation to perceive the condition of the imaging operation or the omnidirectional image by viewing the displayed omnidirectional image. In addition, similarly in the case where the omnidirectional image which is recorded by the imaging operation of the omnidirectional image is reproduced, it is assumed that it is difficult for a user accustomed to images which are recorded by a normal imaging operation to perceive the omnidirectional image even when viewing the omnidirectional image.

Therefore, it is desirable to easily perceive an omnidirectional image which is generated by using an omnidirectional imaging optical system.

According to an embodiment of the present disclosure, there are provided an imaging apparatus including: an imaging portion that images an omnidirectional subject on the basis of an imaging position when imaging is performed and generates a circular image including the omnidirectional subject; an image processing portion that specifies a substantially fan-shaped object region in a circular image which is generated on the basis of a direction specified based on an attitude of an imaging apparatus in the imaging position among all directions and converts an image of the object region into a substantially rectangular image; and a display control portion that simultaneously displays a conversion image which is the converted image and the generated circular image on a display portion, an image processing method, and program which performs the method by computer. Thereby, the following effects are obtained. That is, the circular image (omnidirectional image) is generated, the substantially fan-shaped object region in the circular image on the basis of the specified direction is specified, the image of the object region is converted into the substantially rectangular image, and thus, the converted image (conversion image) and the generated circular image are simultaneously displayed.

In addition, in the embodiment of the present disclosure, the image processing portion may specify the object region so that the specified direction is not cut in the generated circular image. Thereby, the following effect is obtained. That is, the object region is specified so that the specified direction is not cut in the generated circular image.

Moreover, in the embodiment of the present disclosure, the imaging portion may generate the circular image in a state where an adaptor, which includes an omnidirectional imaging optical system for imaging the omnidirectional subject including a subject in an optical axis direction, is mounted, and the image processing portion may include the optical axis direction as the specified direction on the basis of the imaging position. Thereby, the following effects are obtained. That is, the circular image is generated in the state where the adaptor including the omnidirectional imaging optical system is mounted, and the object region is specified while including the optical axis direction of the imaging portion as the specified direction on the basis of the imaging position.

In addition, in the embodiment of the present disclosure, the imaging apparatus may further include the display portion, the optical axis direction may approximately coincide with a direction perpendicular to a display surface in the display portion, and the imaging portion may generate the circular image that includes a subject in the optical axis direction and a subject facing the display surface in a state where the adaptor is mounted. Thereby, the following effects are obtained. That is, in a state where the adaptor is mounted, the circular image including the subject in the optical axis direction of the imaging portion and the subject facing the display surface in the display portion is generated.

Moreover, in the embodiment of the present disclosure, the image processing portion may divide a circumferential direction of the generated circular image into four and specify the four divided regions as the object region so that the subject in the optical axis direction and the subject facing the display surface each are a center position in the conversion image. Thereby, the following effects are obtained. That is, the circumferential direction of the circular image is divided into four so that the subject in the optical axis direction of the imaging portion and the subject facing the display surface in the display portion each are the center position in the conversion image, and the four divided regions are specified as the object region.

In addition, in the embodiment of the present disclosure, the display control portion may display the conversion image and the generated circular image on the display portion at the time of performing the imaging operation of the circular image. Thereby, the following effect is obtained. That is, the conversion image and the circular image are displayed at the time of performing the imaging operation of the circular image.

Moreover, in the embodiment of the present disclosure, the imaging apparatus may further include an operation reception portion that receives a switching operation switching a display state in the display portion, wherein the image processing portion may divide the circumference direction of the generated circular image into a plurality, specify the divided plurality of regions as the object region, and generate the conversion image in plurality, and the display control portion may switch a conversion image, which is displayed on the display portion according to a switching operation when receiving the switching operation, to another conversion image. Thereby, the following effects are obtained. That is, the circumferential direction of the circular image is divided into a plurality, the divided plurality of regions is specified as the object region and a plurality of conversion image is generated, and the conversion image is switched into another conversion image according to the switching operation in the case of receiving the switching operation switching the display condition in the display portion.

In addition, in the embodiment of the present disclosure, the image processing portion may specify the substantially fan-shaped object region so that a position corresponding to the specified direction in the circumference direction of the generated circular image is the specified position in the substantially rectangular image. Thereby, the following effect is obtained. That is, the object region is specified so that the position corresponding to the specified direction in the circumferential direction of the circular image is the specified position in the substantially rectangular image.

Moreover, in the embodiment of the present disclosure, the imaging portion may generate an image, in which an image including the omnidirectional subject is annularly disposed, as the circular image. Thereby, the following effect is obtained. That is, the image in which the image including the omnidirectional subject is annularly disposed is generated as the circular image.

According to another embodiment of the present disclosure, there are provided an image processing apparatus including: an acquisition portion that images an omnidirectional subject on the basis of an imaging position when an imaging of an imaging apparatus is performed and acquires a circular image including the generated omnidirectional subject; and an image processing portion that specifies a substantially fan-shaped object region in the acquired circular image on the basis of a direction specified based on an attitude of the imaging apparatus in the imaging position among all directions, converts an image of the object region into a substantially rectangular image, and includes the image as a display object image, an image processing method, and program which performs the method by computer. Thereby, the following effects are obtained. That is, the circular image (omnidirectional image) is acquired, the substantially fan-shaped object region is specified in the circular image on the basis of the specified direction, and the image of the object region is converted into the substantially rectangular image and includes the image as the display object image.

According to the embodiments of the present disclosure, the omnidirectional image which is generated by using the omnidirectional imaging optical system can be easily perceived.

BRIEF DESCRIPTION OF THE DRAWINGS

FIG. 17 is a flowchart illustrating processing steps of an imaging operation control processing of the omnidirectional image which is performed by the imaging apparatus in the first embodiment of the present disclosure.

DETAILED DESCRIPTION OF EMBODIMENTS

Hereinafter, embodiments of the present disclosure will be described. The description is performed according to the following order.

1. First Embodiment (display control: an example which simultaneously displays an omnidirectional image (annular image) and a conversion image (rectangular image) at the time of performing an imaging operation or a reproduction)

2. Second Embodiment (display control: an example which simultaneously displays an omnidirectional image and a conversion image by using an image processing apparatus)

1. First Embodiment

Appearance Configuration Example of Imaging Apparatus

FIGS. 1A to 2B are views illustrating an appearance configuration example of an imaging apparatus 100 in a first embodiment of the present disclosure.

Figure 1A:
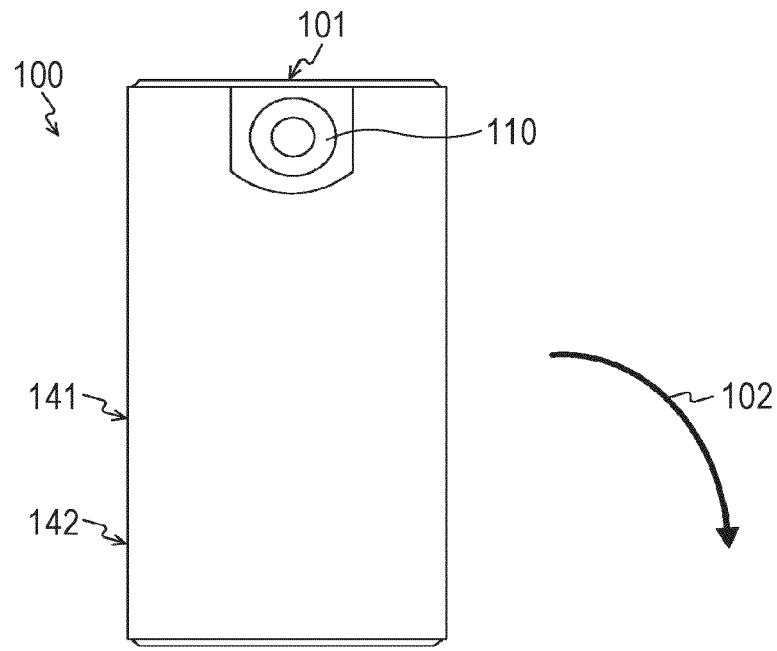
FIGS. 1A and 1B are views illustrating an appearance configuration example of an imaging apparatus in a first embodiment of the present disclosure.
Figure 1B:
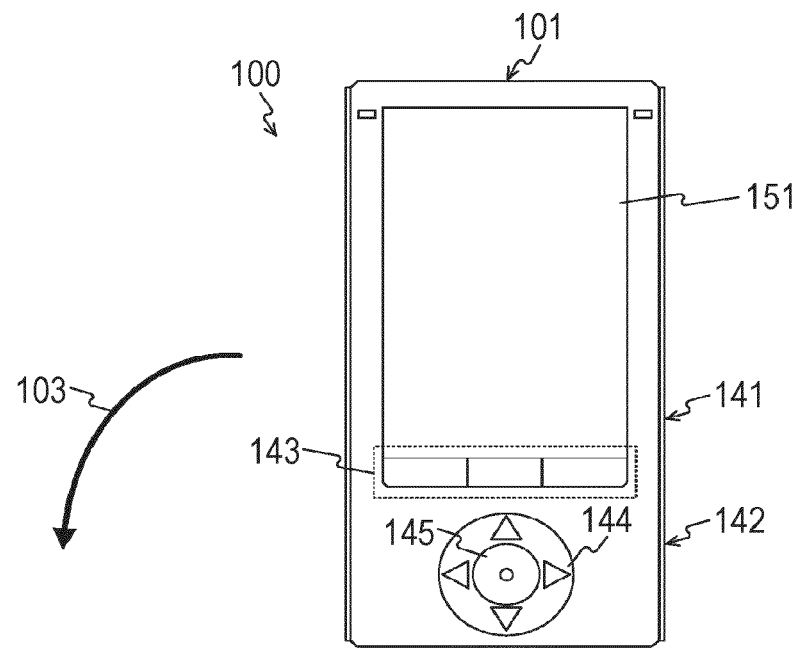
Figure 2A:
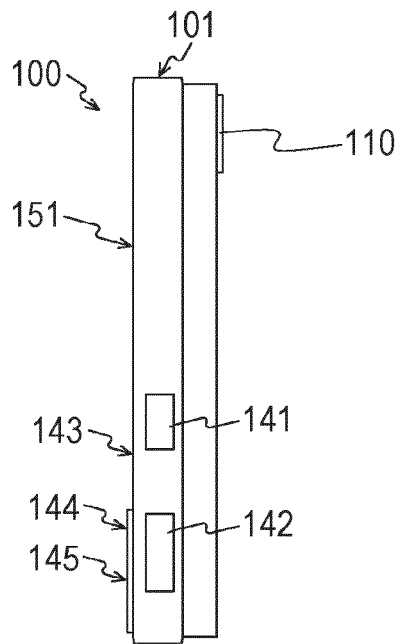
FIGS. 2A and 2B are views illustrating an appearance configuration example of the imaging apparatus in the first embodiment of the present disclosure.
Figure 2B:
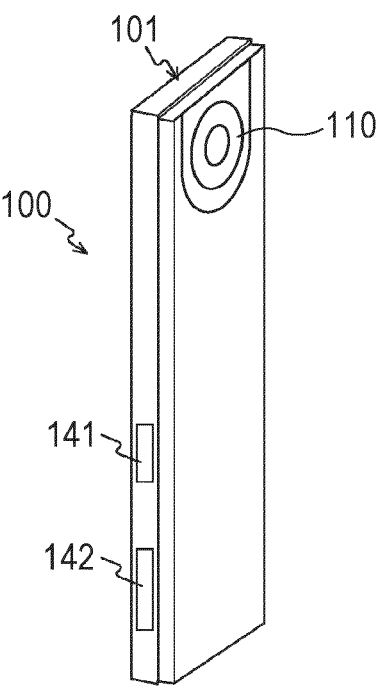

FIG. 1A is a front view illustrating an appearance of a front surface (that is, a surface in which a lens facing a subject is installed) of the imaging apparatus 100. In addition, FIG. 1B is a rear view illustrating an appearance of a rear surface (that is, a surface of an input and output panel 151 facing the photographer) of the imaging apparatus 100. FIG. 2A is a side view illustrating an appearance of a side surface of the imaging apparatus 100. FIG. 2B is a side view illustrating an appearance of a front surface side of the imaging apparatus 100. In addition, for example, the imaging apparatus 100 is realized by an imaging apparatus which generates a captured image (image data) by imaging a subject and can record the generated captured image. For example, the imaging apparatus is a digital still camera, a digital video camera (for example, a camera integrated recorder), or the like.

The imaging apparatus 100 includes an imaging portion 110, a power switch 141, a shutter button 142, an operating button group 143, an up/down and left/right button 144, a recording button 145, and an input and output panel 151. In addition, an adaptor 200 illustrated in FIGS. 3A to 4B is mounted on an upper end 101 of the imaging apparatus 100. In addition, in order to fix the adaptor 200 which is mounted on the upper end 101 (a magnet is installed on a surface abutting the upper end 101), the surface (the upper end surface of the upper portion 101) abutting the adaptor 200 includes a magnetic body.

The imaging apparatus 110 generates a captured image (image data) by imaging the subject. In addition, when the adaptor 200 is mounted, an imaging operation (an omnidirectional imaging operation) of an omnidirectional image is performed by using the imaging portion 110. Moreover, the imaging portion 110 will be described in detail with reference to FIGS. 6 and 7.

The power switch 141 is an operating member which is used when turning on/off power of the imaging apparatus 100.

The shutter button 142 is an operating member which is pressed by a user when recording the image (image data) generated by the imaging portion 110 as content items (still image content items). For example, in a case where an imaging mode is set, a focus control for performing an auto-focusing is performed when the shutter button 142 is half-pressed. In addition, in a case where the shutter button 142 is fully-pressed, the focus control is performed, and the image (image data) generated by the imaging portion 110 when the shutter button is fully-pressed is recorded as the content items (the still image content items). For example, the content items are recorded on a memory card 180 illustrated in FIG. 6.

The operating button group 143 has operating buttons which are used when performing various operations.

The up/down and left/right button 144 is an operating button which performs various operations with respect to up/down and the left/right.

The recording button 145 is an operating button which is pressed by user when recording the image (image data) generated by the imaging portion 110 as content items (moving image content items). For example, in a case where the imaging mode is set, the recording processing of the image (image data) generated by the imaging portion 110 starts when the recording button 145 is pressed. Moreover, in a case where the recording button 145 is again pressed, the recording processing of the image (image data) ends. Through the recording processing, for example, the content items (moving image content items) are recorded on the memory card 180 illustrated in FIG. 6.

The input and output panel 151 displays various images, and receives an operating input from user based on a detection condition of a body which approaches or contacts a display surface. In addition, the input and output panel 151 is also referred to as a touch screen or a touch panel. The input and output panel 151 includes an operation reception portion and a display panel. For example, as the operation reception portion, an electrostatic type (a capacitance type) of touch panel in which contact or approach of a body having conductivity (for example, a human finger) is detected based on variation in capacitance can be used. In addition, for example, as the display panel, display panels such as an LCD (Liquid Crystal Display) and an organic EL (Electro Luminescence) panel can be used. Moreover, for example, the input and output panel 151 is constituted by overlapping a transparent touch panel on the display surface of the display panel.

Appearance Configuration Example of Imaging Apparatus and Adaptor

FIGS. 3A to 4B are views illustrating an appearance configuration example of the imaging apparatus 100 and the adaptor 200 in the first embodiment of the present disclosure. FIGS. 3A to 4B illustrate the appearance configuration in a case where the adaptor 200 is mounted on the imaging apparatus 100 illustrated in FIGS. 1A to 2B.

Figure 3A:
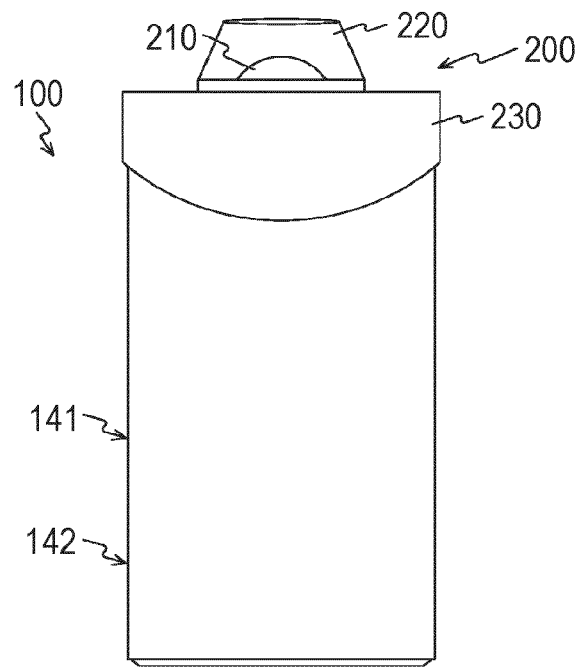
FIGS. 3A and 3B are views illustrating an appearance configuration example of the imaging apparatus and an adaptor in the first embodiment of the present disclosure.
Figure 3B:
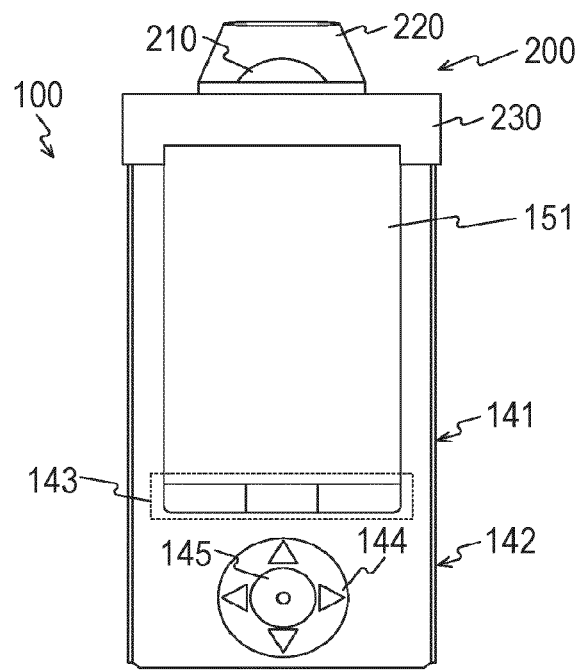
Figure 4A:
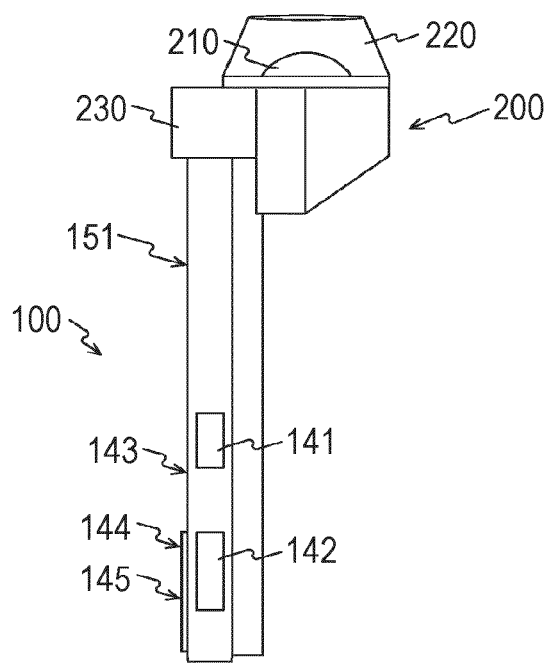
FIGS. 4A and 4B are views illustrating an appearance configuration example of the imaging apparatus and the adaptor in the first embodiment of the present disclosure.
Figure 4B:
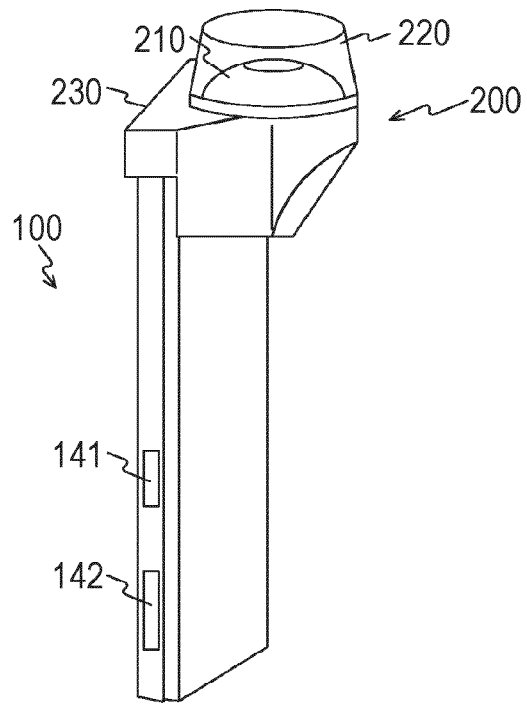

FIG. 3A is a front view illustrating the appearance of the front surface of the imaging apparatus 100 and the adaptor 200. In addition, FIG. 3B is a rear view illustrating the appearance of the rear surface of the imaging apparatus 100 and the adaptor 200. FIG. 4A is a side view illustrating the appearance of the side surface of the imaging apparatus 100 and the adaptor 200. Moreover, FIG. 4B is a perspective view illustrating the appearance of the front surface side of the imaging apparatus 100 and the adaptor 200.

Figure 5:
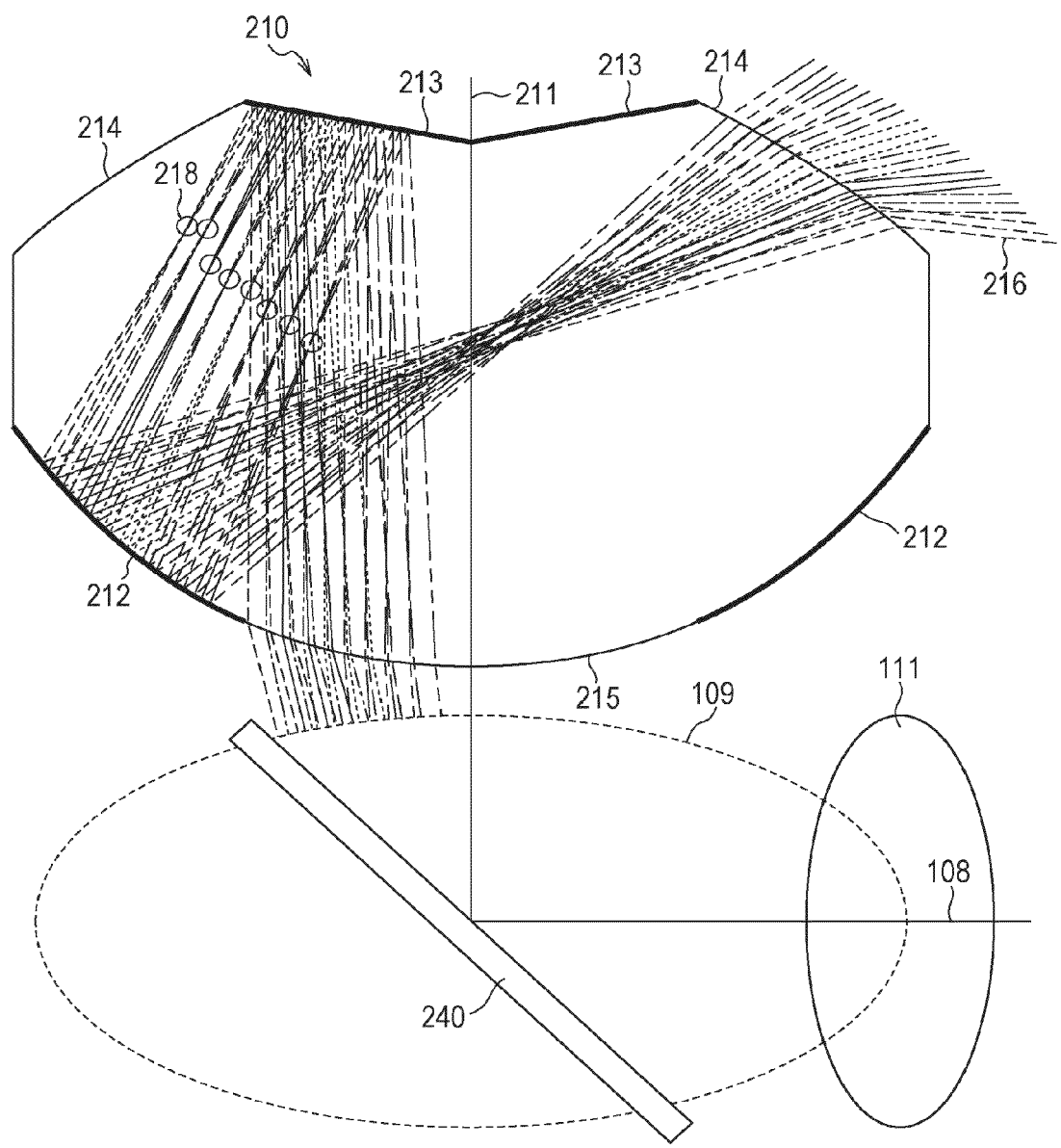
FIG. 5 is a cross-sectional diagram illustrating an omnidirectional imaging optical system which can be included in the adaptor in the first embodiment of the present disclosure.

The adaptor 200 is an adaptor which can be attached to and detached from the imaging apparatus 100, and is an attachment for omnidirectional (entire peripheral) imaging. The adaptor 200 includes an omnidirectional imaging optical system 210, a cover 220, an attachment portion 230, and a mirror 240. In addition, FIG. 5 illustrates the mirror 240.

The omnidirectional imaging optical system 210 is an optical system for imaging an omnidirectional (entire peripheral) subject of the imaging apparatus 100. Moreover, the omnidirectional imaging optical system 210 will be described in detail with reference to FIG. 5.

The cover 220 is a cylindrical cover which covers the omnidirectional imaging optical system 210.

The attachment portion 230 is an attachment portion for mounting the adaptor 200 to the imaging apparatus 100, and has a shape which can be fitted to the upper end 101 (illustrated in FIGS. 1A to 2B) of the imaging apparatus 100. In addition, a magnet 201 (illustrated in FIG. 6) is installed in a bottom portion (a portion which abuts the upper surface in the upper end 101 of the imaging apparatus 100) in a concave portion of the attachment portion 230. Thereby, when the attachment portion 230 is fitted to and mounted on the upper end 101 of the imaging apparatus 100, the adaptor 200 is fixed to the upper end 101 of the imaging apparatus 100 by the magnet 201. Moreover, in the state where the adaptor 200 is mounted on the imaging apparatus 100, the imaging portion 110 is covered by the attachment portion 230. In this case, the omnidirectional subject image which is focused by the omnidirectional imaging optical system 210 of the adaptor 200 is incident to an imaging optical system 111 (illustrated in FIG. 6) of the imaging portion 110 and imaged at imaging device 112 (illustrated in FIG. 6).

In this way, due to the fact that the adaptor 200 including the omnidirectional imaging optical system 210 is mounted on the imaging portion 110, the omnidirectional imaging operation can be performed by using the imaging apparatus 100 in which the omnidirectional imaging optical system is not housed. The omnidirectional imaging operation means an operation imaging the subject which is present in all directions (0° to 360°) of the imaging apparatus 100.

In this way, when the adaptor 200 is mounted, the omnidirectional subject image of the imaging apparatus 100 is imaged by using both the omnidirectional imaging optical system 210 of the adaptor 200 and the imaging optical system 111 of the imaging portion 110. In addition, as illustrated in FIGS. 9A to 10B or the like, an omnidirectional image 420 which images the omnidirectional subject of the imaging apparatus 100 is generated by the omnidirectional imaging operation which uses the omnidirectional imaging optical system 210. Moreover, the generated omnidirectional image 420 is displayed on the input and output panel 151 as a through-image.

In addition, as illustrated in FIGS. 1A to 2B, the case where the adaptor 200 is not mounted on the imaging portion 110 is assumed. In this case, when the imaging mode is set, the imaging apparatus 100 performs the imaging operation by using the housed imaging optical system 111. The imaging operation is an operation imaging the subject which is present in one direction specified (an imaging direction which faces the optical axis of the imaging optical system 111) on the basis of the position (imaging position) when performing the imaging of the imaging apparatus 100 by using the imaging optical system 111. In the imaging operation, the subject image in one direction is incident via the imaging optical system 111 and imaged in the imaging device 112.

As illustrated in FIGS. 1A to 4B, the adaptor 200 is constituted so as to be attached to and detached from the imaging portion 110 of the imaging apparatus 100. Thereby, due to the fact that the adaptor 200 is mounted on the imaging portion 110, a user can easily perform the omnidirectional imaging operation by using the imaging apparatus 100.

Configuration Example of Omnidirectional Imaging Optical System

FIG. 5 is a cross-sectional diagram illustrating an omnidirectional imaging optical system 210 which can be included in the adaptor 200 in the first embodiment of the present disclosure. FIG. 5 illustrates an example of a twice reflective type of omnidirectional imaging optical system 210.

The omnidirectional imaging optical system 210 is an omnidirectional imaging lens which includes a convex mirror and a concave mirror, which have a shape having rotational symmetry with respect to a center axis 211. In addition, the center axis 211 is disposed on a line in which the angle between the optical axis 108 of the imaging optical system 111 of the imaging portion 110 and the center axis 211 is 90°. That is, the subject image focused by the omnidirectional imaging optical system 210 is reflected by the mirror 240, the optical path is changed to 90°, and the subject image is supplied to the imaging optical system 111.

The omnidirectional imaging optical system 210 includes a first reflective surface 212, a second reflective surface 213, a light incident portion 214, and a light outputting portion 215.

The first reflective surface 212 is an annular reflective surface which is positioned below the omnidirectional imaging optical system 210, and is constituted by a mirror-finished annular concave mirror. The second reflective surface 213 is a conical surface shaped reflective surface which is disposed so as to be opposite to the first reflective surface 212, and is constituted by a mirror-finished convex mirror.

The light incident portion 214 is an annular light incident portion which is disposed at the outer periphery of the second reflective surface 213 and is constituted by a transparent glass plate. Thus, light is transmitted to the light incident portion 214. The light outputting portion 215 is a light outputting portion which is disposed at the inner periphery of the first reflective surface 212 and is constituted by a transparent glass plate. Thus, light is transmitted to the light outputting portion 215.

Here, since the omnidirectional imaging optical system 210 is a twice reflective type, the optical characteristic of the omnidirectional imaging optical system 210 is designed so that all the focuses 218 of the subjects at an arbitrary distance from the omnidirectional imaging optical system 210 are positioned between the first reflective surface 212 and the second reflective surface 213. In addition, in FIG. 5, the focuses 218 of the subject are schematically illustrated by a plurality of circles.

In the omnidirectional imaging optical system 210, if incident light 216 is incident from the light incident portion 214, the light is reflected by the second reflective surface 213 after being reflected by the first reflective surface 212, and the light is incident to the light outputting portion 215. In addition, the light exited from the light outputting portion 215 is reflected by the mirror 240 and the optical path is changed to 90°. Thereafter, the light is incident into the imaging optical system 111 of the imaging portion 110 and supplied to the imaging device 112. Moreover, in FIG. 5, for ease of the explanation, only the light exited up to an ellipse 109 corresponding to the imaging optical system 111 is illustrated as the light exited from the light outputting portion 215.

In this way, the omnidirectional imaging optical system 210 can acquire the subject image which is the range of 360° about the center axis 211. Thereby, the omnidirectional imaging optical system 210 focuses an omnidirectional (360°) subject image which is positioned at the periphery, and can supply the image to the imaging optical system 111.

In addition, in FIG. 5, the twice reflective type of the omnidirectional imaging optical system 210 is described as the example. However, a once reflective type of an omnidirectional imaging optical system also may be used. The once reflective type of the omnidirectional imaging optical system includes a single reflective surface which reflects the light from the omnidirectional subject. In addition, in the once reflective type of the omnidirectional imaging optical system, the single reflective surface is constituted by a convex mirror having a shape which is rotational symmetry with respect to the center axis, and is disposed so that the light reflected from the reflective surface face the imaging optical system 111 of the imaging apparatus 100.

Inner Configuration Example of Imaging Apparatus

Figure 6:
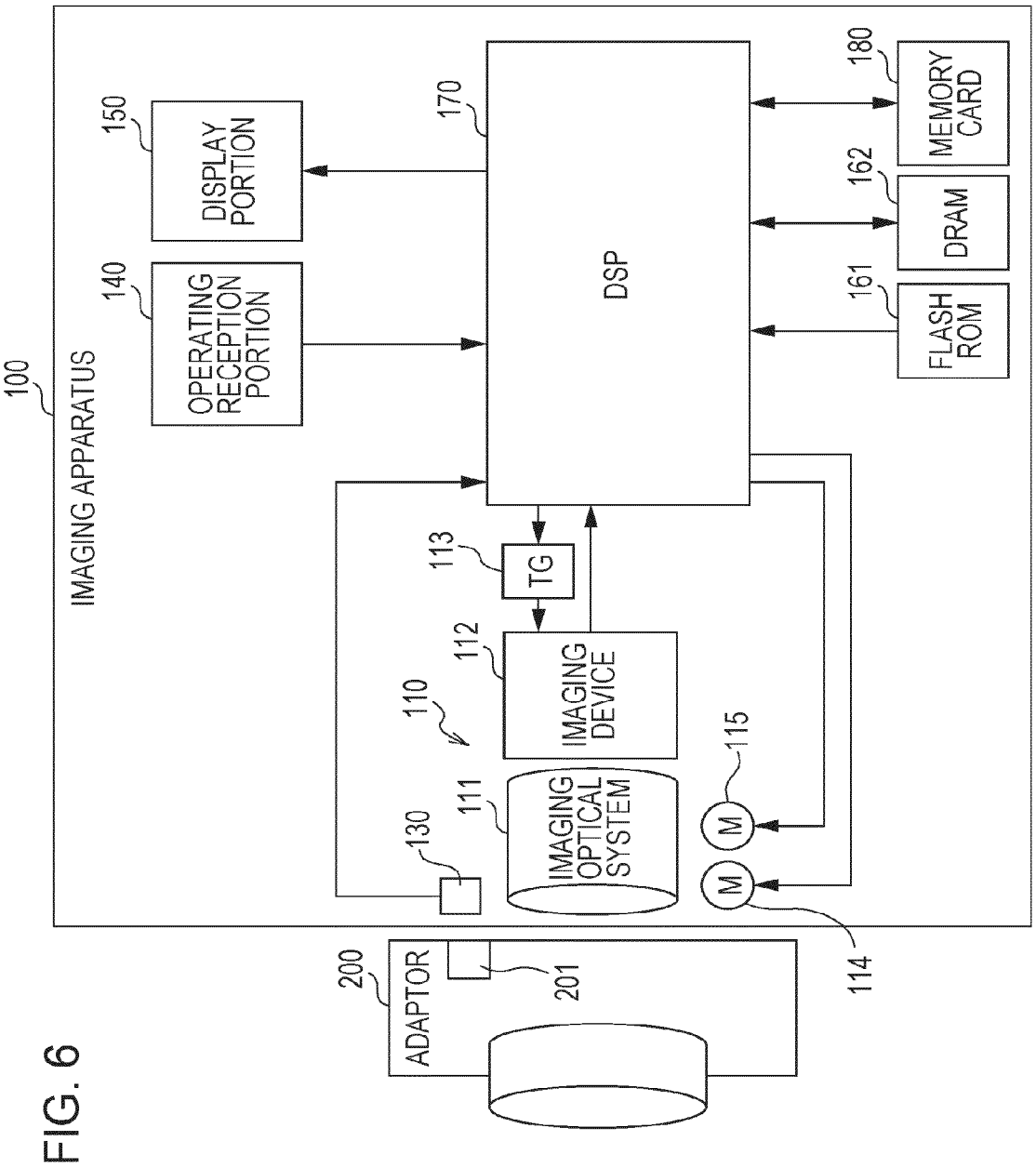
FIG. 6 is a block diagram illustrating an inner configuration example of the imaging apparatus in the first embodiment of the present disclosure.

FIG. 6 is a block diagram illustrating an inner configuration example of the imaging apparatus 100 in the first embodiment of the present disclosure. In addition, FIG. 6 illustrates the adaptor 200 which is mounted on the imaging apparatus 100 along with the inner configuration of the imaging apparatus 100.

The imaging apparatus 100 includes the imaging portion 110, a hall sensor 130, the operation reception portion 140, the display portion 150, and a flash ROM (Read Only Memory) 161. Moreover, the imaging apparatus 100 includes a DRAM (Dynamic Random Access Memory) 162, a DSP (Digital Signal Processor) 170, and the memory card 180.

The imaging portion 110 includes the optical system for generating the captured image, the imaging device, or the like. That is, the imaging portion 110 includes the imaging optical system 111, the imaging device 112, a TG (Timing Generator) 113, and optical component driving portions 114 and 115.

The imaging optical system 111 is an optical system which is optically designed for imaging the subject in one direction, and includes optical components such as various lenses such as a focus lens and a zoom lens, an optical filter which removes an unnecessary wavelength, and an aperture. The optical image (subject image) incident from the subject is imaged on an exposure surface of the imaging device 112 via each optical component in the imaging optical system 111. Moreover, the optical component driving portions 114 and 115 is mechanically connected to the imaging optical system 111 in order to drive the optical components which constitute the imaging optical system 111.

The imaging device 112 generates an electric signal (analog image signal) by photoelectrically converting the optical image which is supplied from the imaging optical system 111, and outputs the generated electric signal to the DSP 170. As the imaging device 112, for example, solid-state imaging devices such as a CCD (Charge Coupled Device) or a CMOS (Complementary Metal Oxide Semiconductor) can be used.

The TG 113 is a timing generator which generates an operation pulse which is necessary in the imaging device 112 based on the control of the DSP 170. For example, the TG 113 generates various pulses such as a four-phase pulse for a vertical transfer, a field shift pulse, a two-phase pulse for a horizontal transfer, and a shutter pulse, and supplies the pulses to the imaging device 112. Moreover, the subject image is imaged by driving of the imaging device 112 through the TG 113. In addition, due to the fact that the TG 113 adjusts a shutter speed of the imaging device 112, the exposure amount or the exposure period of the captured image is controlled (electronic shutter function).

The optical component driving portions 114 and 115 drives the optical components constituting the imaging optical system 111 based on the control of the DSP 170, and for example, includes a zoom motor, a focus motor, or the like. For example, the optical component driving portion 114 and 115 move the zoom lens, the focus lens, or the like constituting the imaging optical system 111, and adjust the aperture.

The hall sensor 130 is a hall sensor which is installed in the portion (the portion adjacent to the magnet 201 when the adaptor 200 is mounted) of the inner side of the upper end 101, and detects a magnetic flux density of a magnetic field which is generated by the magnet 201 when the adaptor 200 is mounted. As illustrated above, the magnet 201 is installed in the bottom portion (the portion which abuts the upper end surface in the upper end 101 of the imaging apparatus 100) in the concave portion of the attachment portion 230 of the adaptor 200.

For example, in the case where the adaptor 200 is mounted on the upper end 101 of the imaging apparatus 100, since the magnet 201 is disposed in the vicinity of the hall sensor 130, the hall sensor 130 detects a magnetic field, which is a predetermined magnetic flux density or more, from the magnet 201. On the other hand, in the case where the adaptor 200 is not mounted on the upper end 101 of the imaging apparatus 100, the hall sensor 130 does not detect a magnetic field, which is a predetermined magnetic flux density or more, from the magnet 201. In this way, according to a magnetic field strength detected by the hall sensor 130, whether or not the adaptor 200 is mounted on the upper end 101 of the imaging apparatus 100 can be detected. In addition, the hall sensor 130 outputs information (magnetic field strength information) in relation to the detected magnetic field strength to the DSP 170, and the DSP 170 determines the mounting condition (mounting of the adaptor 200 or not) of the adaptor 200 with respect to the imaging portion 110 based on the magnetic field strength information. Moreover, the DSP 170 switches various operation settings of the imaging apparatus 100 according to whether or not the adaptor 200 is mounted.

The operation reception portion 140 is an operation reception portion which receives the operation input from user, and outputs the operation signal to the DSP 170 according to the received operation input. For example, as illustrated in FIGS. 1A to 4B, the operation reception portion 140 correspond to the power switch 141, the shutter button 142, the operating button group 143, the up/down and left/right button 144, the recording button 145, and the input and output panel 151. For example, the switching operation which switches the display condition in the display portion 150 can be received by the operating button group 143 (for example, illustrated in FIGS. 14 and 15).

For example, the display portion 150 includes a liquid crystal display (LCD), an organic EL display, or the like. The display 150 displays various image data which is input based on the control of the DSP 170. For example, the display portion 150 displays the captured image (through-image) during imaging which is input in real time from the DSP 170 during the imaging operation. Thereby, the user can operate the imaging apparatus 100 while viewing the image during the imaging operation through the display portion 150. In addition, in a case where a reproduction instruction operation of the content items stored on the memory card 180 is performed, the display 150 displays the content items input from the DSP 170. Thereby, the user can confirm what is included in the content items which are stored on the memory card 180.

The flash ROM 161 is memory which stores programs for performing various control processings of the DSP 170. The DSP 170 is operated based on the programs stored on the flash ROM 161, and performs a calculation and control processing which is necessary for performing each control by using the DRAM 162. Moreover, the program may be provided from a removable recording medium such as a disk-shaped recording medium or memory card to the DSP 170, and is downloaded on the DSP 170 through a network such as the Internet.

The DSP 170 is a calculation processing device for performing an image processing of the captured image or an operating control of the imaging apparatus 100. The DSP 170 includes a signal processing portion (not illustrated), a recording and reproduction portion (not illustrated), and a control portion (not illustrated). For example, the signal control portion performs a predetermined signal processing with respect to the image signal (analog image signal) output from the imaging device 112, and outputs the image signal (digital image signal) after the signal processing to the display portion 150 or the recording and reproduction portion. For example, the signal processing portion includes an analog signal processing portion, an A/D (analog/digital) conversion portion, and a digital signal processing portion.

The analog signal processing portion is a processing portion (a so-called analog front end) which preprocesses the image signal. For example, the analog signal processing portion performs a CDS (correlated double sampling) processing, a gain processing by a programmable gain amp (PGA), or the like with respect to the image signal output from the imaging device 112. The A/D conversion portion converts the image signal (analog image signal) output from the analog signal processing portion into a digital image signal, and outputs the converted signal to the digital signal processing portion. The digital signal processing portion performs digital signal processings such as noise removal, a white balance adjustment, a color correction, an edge enhancement, and a gamma correction with respect to the digital image signal output from the A/D conversion portion, and outputs the processed signal to the display portion 150, the recording and reproduction portion, and the like.

The control portion of the DSP 170 includes a calculation processing device such as a micro controller installed in the DSP 170, and controls the overall operation of the imaging apparatus 100. For example, the control portion performs a control function by using the DRAM 162 or the flash ROM 161. For example, the control portion of the DSP 170 controls the TG 113 or the optical component driving portions 114 and 115, and controls the imaging operation by the imaging portion 110. For example, the control portion of the DSP 170 performs an automatic exposure control (AE function) by the adjustment of the aperture of the imaging optical system 111, the setting of the electronic shutter speed of the imaging device 112, the gain setting of AGC of the signal processing portion, or the like. In addition, the control portion of the DSP 170 moves the focus lens of the imaging optical system 111, and performs an auto focus control (AF function) which automatically matches the focus of the imaging optical system 111 with respect to a specific subject. Moreover, the control portion of the DSP 170 moves the zoom lens of the imaging optical system 111, and adjusts an angle of view of the captured image. In addition, the control portion of the DSP 170 controls a recording and reproduction processing of the captured image data by the recording and reproduction portion. Moreover, the control portion of the DSP 170 performs the display control for displaying various display data on the display portion 150.

The memory card 180 is a recording medium which can be attached to and detached from the imaging apparatus 100. In addition, for example, as the recording medium, disk-shaped recording media such as another semiconductor memory, an optical disc, a hard disk, or the like may be used. For example, as the optical disc, a blu-ray disc, a DVD (Digital Versatile Disc), a CD (Compact Disc), or the like can be used. Moreover, the recording medium may be housed in the imaging apparatus 100, and may be a remote medium which can be attached to and removed from the imaging apparatus 100.

Functional Configuration Example of Imaging Apparatus

Figure 7:
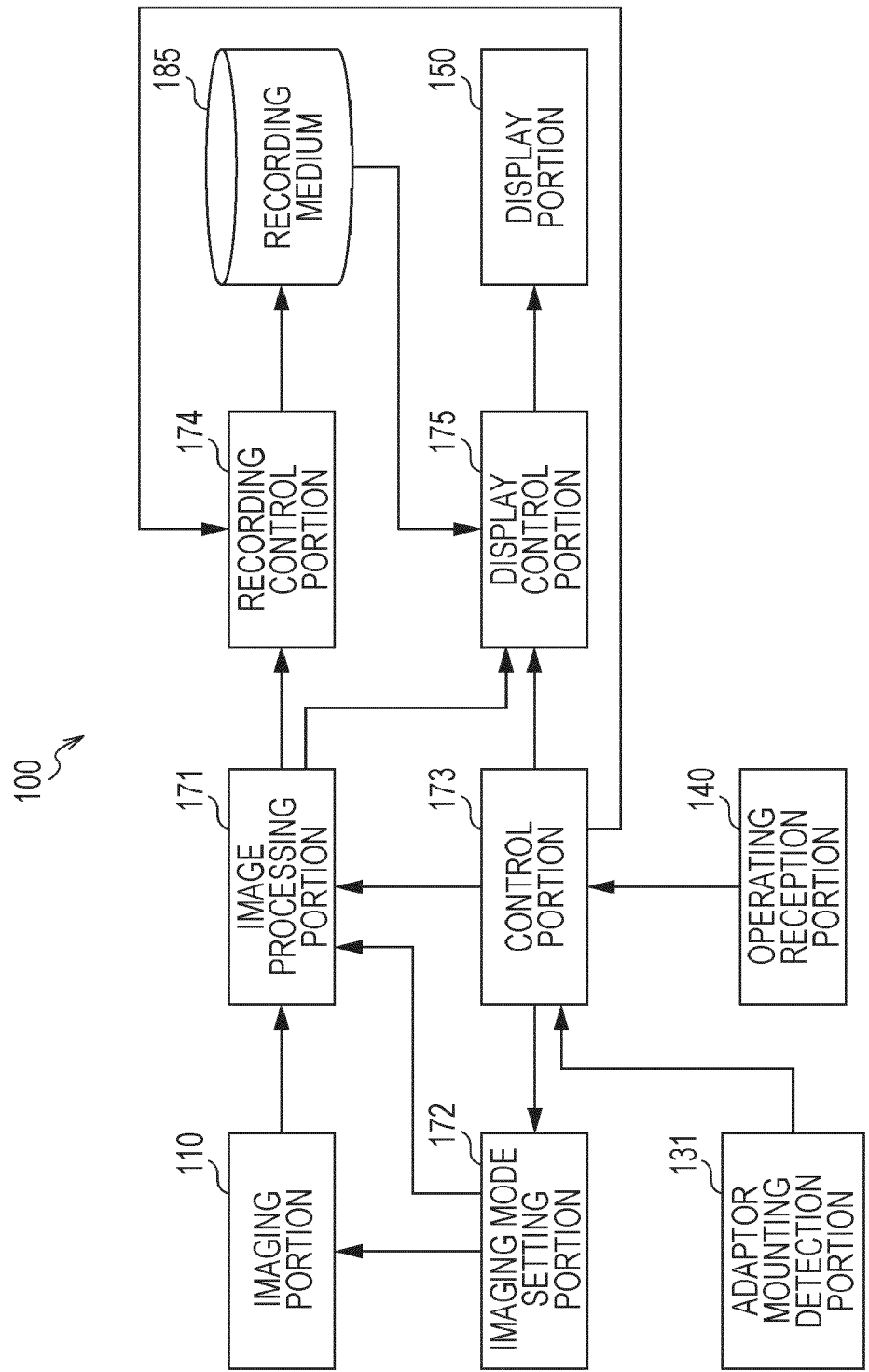
FIG. 7 is a block diagram illustrating a functional configuration example of the imaging apparatus in the first embodiment of the present disclosure.

FIG. 7 is a block diagram illustrating a functional configuration example of the imaging apparatus 100 in the first embodiment of the present disclosure. In addition, with respect to the same parts as those of the functional configuration illustrated in FIG. 6, the same reference numbers are denoted and a portion of the descriptions are omitted.

The imaging apparatus 100 includes the imaging portion 110, the adaptor mounting detection portion 131, the operation reception portion 140, the display portion 150, the image processing portion 171, an imaging mode setting portion 172, a control portion 173, a recording control portion 174, a display control portion 175, and a recording medium 185. In addition, the recording medium 185 corresponds to the memory card 180 illustrated in FIG. 6. In addition, the image processing portion 171, the imaging mode setting portion 172, the control 173, the recording control portion 174, and the display control portion 175 correspond to the DSP 170 illustrated in FIG. 6. Moreover, the adaptor mounting detection portion 131 corresponds to the hall sensor 130 illustrated in FIG. 6.

The imaging portion 110 is an imaging portion which images the subject in a specific direction (for example, the optical axis direction) and generates a plane image (image data) including the subject, and performs the imaging processing according to the imaging mode which is set by the imaging mode setting portion 172. Here, as the imaging mode, any one of the imaging mode of the plane image or the imaging mode of the omnidirectional image is set. The imaging mode of the plane image is an imaging mode which records a plane image including the subject of a specific direction (for example, optical axis direction). Moreover, the imaging mode of the omnidirectional image is an imaging mode which records a plane image (omnidirectional image) including the omnidirectional subject in the state where the adaptor 200 is mounted on the imaging portion 110. Moreover, in each imaging mode described above, any one of a still image capturing mode for recording a still image or a moving image capturing mode for recording a moving image can be set. That is, in the case where either the plane image capturing mode or the omnidirectional image capturing mode is set, any one of the recording operation of the still image and the recording operation of the moving image can be performed based on the operation of the user.

For example, when the plane image capturing mode is set, the imaging portion 110 generates the plane image by imaging the subject in a specific direction. In addition, when the omnidirectional image capturing mode is set (when the adaptor 200 is mounted), the imaging portion 110 generates an annular plane image (omnidirectional image) by imaging the omnidirectional subject on the basis of the imaging position when the imaging is performed. The omnidirectional image includes the subject in the optical axis direction of the imaging portion 110 and the subject which is opposite to the display surface of the display portion 150 (for example, illustrated in FIGS. 9A to 10B). In addition, the optical axis direction of the imaging portion 110 approximately coincides with the vertical direction of the display surface in the display portion 150. Moreover, the imaging portion 110 outputs the generated image to the image processing portion 171.

The adaptor mounting detection portion 131 detects whether or not the adaptor 200 is mounted on the upper end 101 of the imaging apparatus 100, and outputs the detection result (adaptor mounting information) to the control portion 173.

The image processing portion 171 performs various image processings with respect to the image which is output from the imaging portion 110 based on the control of the control portion 173, and outputs the image output from the imaging portion 110 and the image subjected to the image processing to the recording control portion 174 and the display control portion 175. Moreover, the image processing portion 171 performs the image processing according to the imaging mode set by the imaging mode setting portion 172. For example, the image processing portion 171 specifies a substantially fan-shaped object region in the omnidirectional image which is generated by the imaging portion 110 on the basis of a specific direction among all directions, and converts the image of the object region into a substantially rectangular image (conversion image). Here, the specific direction is a direction which is specified based on an attitude of the imaging apparatus 100 in the imaging position when the imaging is performed, and for example, is the optical axis direction of the imaging portion 110 or the vertical direction of the display surface in the display portion 150. In addition, the image processing portion 171 specifies the object region so that the specific direction in the omnidirectional image generated by the imaging portion 110 is not cut. For example, the image processing portion 171 divides the circumferential direction of the entire peripheral image into four so that the subject of the optical axis direction of the imaging portion 110 and the subject opposite to the display surface in the display portion 150 each are positioned at the center position in the conversion image. In addition, the image processing portion 171 specifies the four divided regions as the object region, and the images of the four object regions are each converted and become the conversion images (for example, refer to FIGS. 13A and 13B. In addition, the image processing portion 171 corresponds to the signal processing portion of the DSP 170.

The imaging mode setting portion 172 sets the imaging mode in the imaging portion 110 based on the control of the control portion 173. Specifically, the imaging mode setting portion 172 sets any one of the plane image capturing mode and the omnidirectional image capturing mode as the imaging mode. In addition, in the case where the adaptor 200 is not mounted on the imaging portion 110, the imaging mode is set based on the user operation (setting operation) which is received by the operation reception portion 140. On the other hand, in the case where the adaptor 200 is mounted on the imaging portion 110, the omnidirectional image capturing mode is set. That is, when the mounting of the adaptor 200 is detected, in the case where the plane image capturing mode is set, the set imaging mode is released, and the omnidirectional image capturing mode is set. Moreover, when the setting operation for setting to the plane image capturing mode is performed by the user operation in the state where the mounting of the adaptor 200 is detected, the setting operation is invalid.

Here, in the imaging apparatus 100, according to characteristics of the imaging optical system 111 which is previously mounted, the setting of the imaging parameters for controlling zoom, focus, exposure, or the like is optimized. In addition, the setting of the display processing or the setting of the operation control also in the imaging apparatus 100 is designed according to the characteristic of the imaging optical system 111. Thereby, when the adaptor 200 is mounted on the imaging apparatus 100, according to the characteristic of the omnidirectional imaging optical system 210 mounted on the adaptor 200, it is necessary to perform changing of the setting of the imaging parameters and switching of the setting of the display processing or the operation control. Therefore, in the first embodiment of the present disclosure, when the adaptor 200 is mounted on the imaging apparatus 100, various settings of the imaging apparatus 100 are automatically controlled according to the characteristic of the omnidirectional imaging optical system 210. That is, in the setting processing of the imaging mode, for example, the setting (for example, setting of the imaging parameter in relation to the imaging processing) of the imaging processing by the imaging portion 110, the setting of the display processing by the display portion 150, the setting of the control of the user operation by using the operation reception portion 140, or the like are automatically performed.

The control portion 173 performs the control of the entire imaging apparatus 100. For example, the control portion 173 performs the control according to the operation input from user which is received by the operation reception portion 140. In addition, the control portion 173 corresponds to the control portion of the DSP 170.

The recording control portion 174 performs a compression recording processing of the image which is output from the image processing portion 171 based on the control of the control portion 173. For example, in the case where the imaging mode is set, the recording control portion 174 compresses the captured image (frame) by a predetermined compression encoding type when the recording button 145 (illustrated in FIGS. 1A and 1B or the like) is pressed. Moreover, the compressed imaging signal is recorded on the recording medium 185 as moving image content items. In addition, in the case where the imaging mode is set, the recording control portion 174 compresses the captured image (still image) by a predetermined compression encoding type when the shutter button 142 (illustrated in FIGS. 2A and 2B) is pressed, and records the compressed image on the recording medium 185 as still image content items.

The display control portion 175 displays the image output from the image processing portion 171 or the image stored on the recording medium 185 on the display portion 150 based on the control of the control portion 173. For example, in the case where the imaging mode is set, the display control portion 175 displays the image output from the image processing portion 171 on the display portion 150 as a through-image. In addition, for example, in the case where the omnidirectional image capturing mode is set, the display control portion 175 simultaneously displays the conversion image output from the image processing portion 171 and the omnidirectional image on the display portion 150 as a through-image (for example, illustrated in FIG. 14). In this case, when the switching operation of the conversion image is received, the display control portion 175 switches the conversion image displayed on the display portion 150 into another conversion image according to the switching operation. In addition, in the case where the reproduction mode is set, the display control portion 175 acquires the content items, which is related to the reproduction instruction operation from the operation reception portion 140, from the recording medium 185, and decompresses the compressed image data and displays the decompressed image data on the display portion 150. Moreover, the recording control portion 174 and the display control portion 175 correspond to the recording and reproduction portion of the DSP 170.

Relationship Example of Imaging Range and Captured Image

Figure 8A:
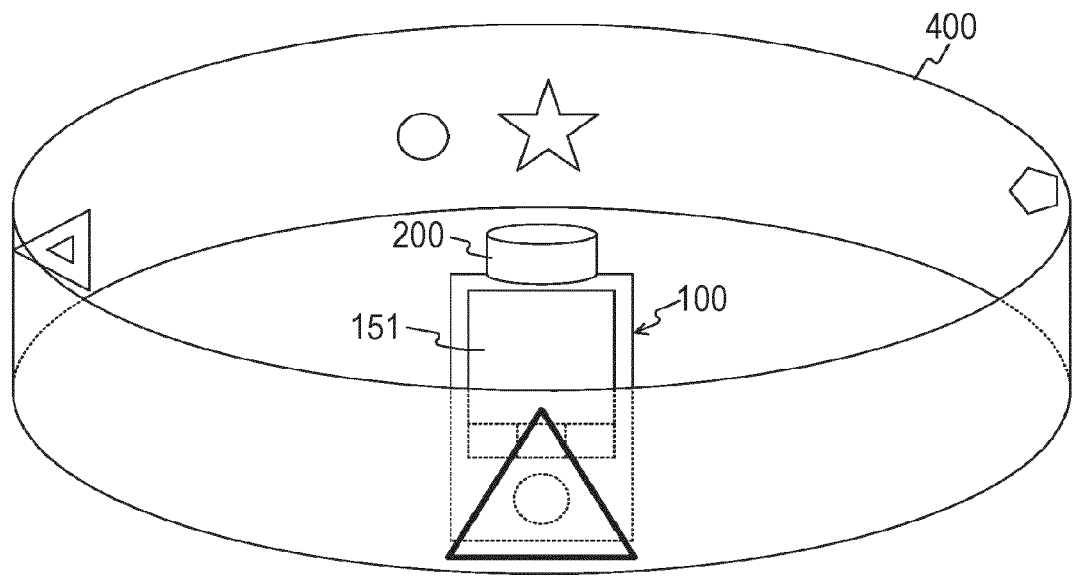
FIGS. 8A and 8B are diagrams schematically illustrating a relationship between an imaging range which is an imaging object of the imaging apparatus and a captured image which is generated by the imaging apparatus in the first embodiment of the present disclosure.
Figure 8B:
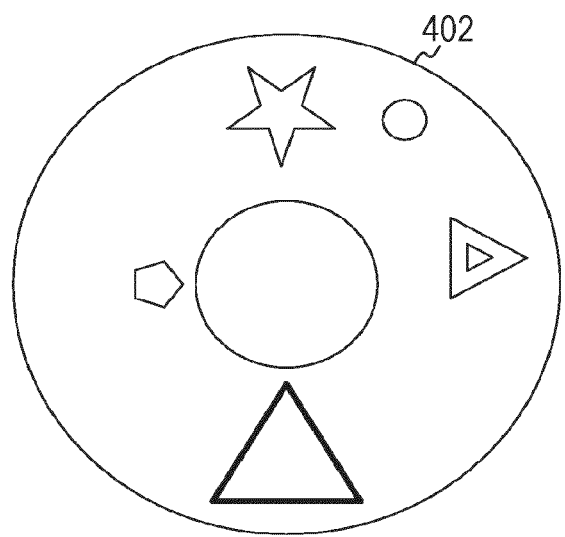

FIGS. 8A and 8B are diagrams schematically illustrating a relationship between an imaging range which is an imaging object by the imaging apparatus 100 and a captured image which is generated by the imaging apparatus 100 in the first embodiment of the present disclosure.

FIG. 8A schematically illustrates an imaging range 400 in the case where the omnidirectional imaging operation is performed by using the imaging apparatus 100 on which the adaptor 200 is mounted. In addition, FIG. 8B schematically illustrates an omnidirectional image 402 (annular image) which is generated by the imaging apparatus 100 when the omnidirectional imaging operation is performed in the state illustrated in FIG. 8A. Moreover, star, circle, triangle or the like which illustrate the corresponding relationship are disposed in the imaging range 400 and the omnidirectional image 402.

As illustrated in FIGS. 8A and 8B, in the case where the omnidirectional imaging operation is performed by using the imaging apparatus 100 on which the adaptor 200 is mounted, the annular omnidirectional image 402 corresponding to the imaging range 400 is generated. In this case, the omnidirectional image 402 illustrated in FIG. 8B is displayed on the input and output panel 151 (for example, illustrated in FIG. 14).

Imaging Operation Example of Captured Image

FIGS. 9A to 10B are diagrams illustrating a relationship between an imaging operation which is performed by using the imaging apparatus 100 and the captured image which is generated by the imaging operation in the first embodiment of the present disclosure.

Figure 9A:
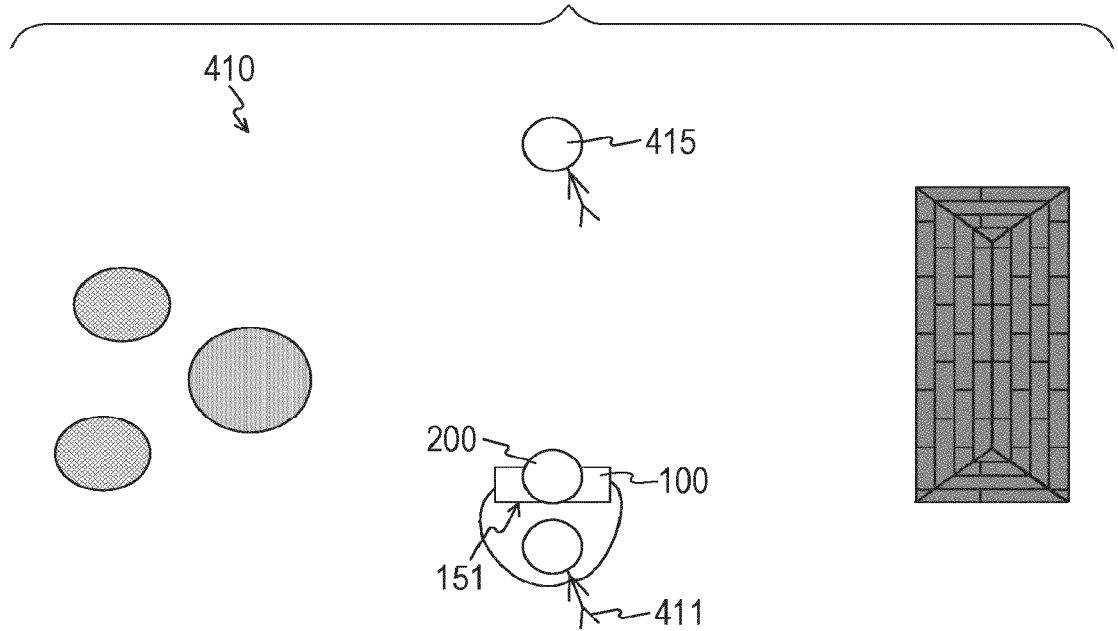
FIGS. 9A and 9B are diagrams illustrating a relationship between an imaging operation which is performed by using the imaging apparatus and the captured image which is generated by the imaging operation in the first embodiment of the present disclosure.
Figure 9B:
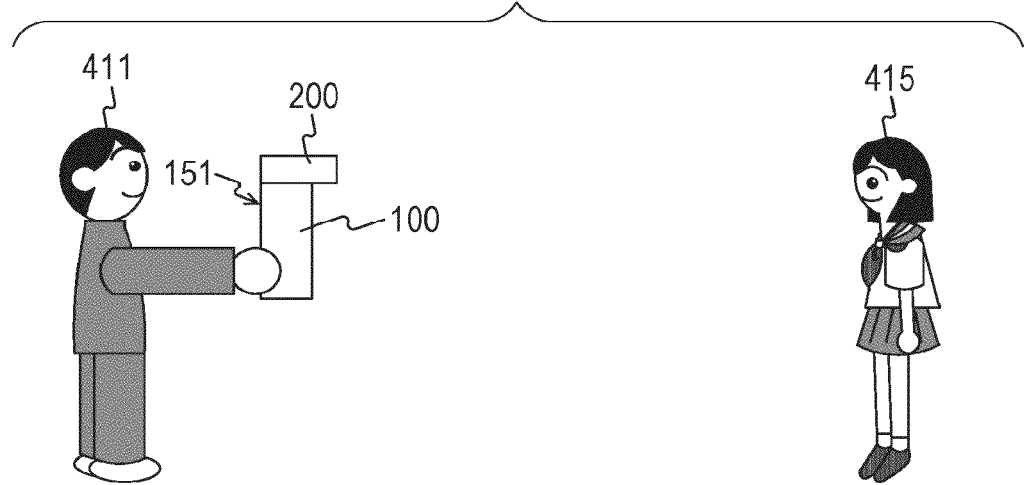

FIG. 9A is top diagram in a case of viewing a place 410, which is the imaging object in the case where the omnidirectional image (annular image) is generated by using the imaging apparatus 100, from the top. FIG. 9B illustrates the case of viewing the imaging operation, which is performed in the state illustrated in FIG. 9A, from the side surface.

The place 410 is a place which includes a house, tree, or the like (in FIG. 9B, the house and the tree are omitted), and in FIGS. 9A and 9B, these are simplified for ease of explanation. In addition, in FIGS. 9A and 9B, the imaging operation example in the case where the adaptor 200 is mounted on the imaging apparatus 100 is illustrated. In addition, FIGS. 9A and 9B illustrate an example in which a user operates the imaging apparatus 100 and performs the imaging operation (omnidirectional imaging operation) of the omnidirectional image (annular image) so that a person 415 is positioned in front of a person (photographer) 411 who holds the imaging apparatus 100 on the adaptor 200 which is mounted by hand.

Figure 10A:
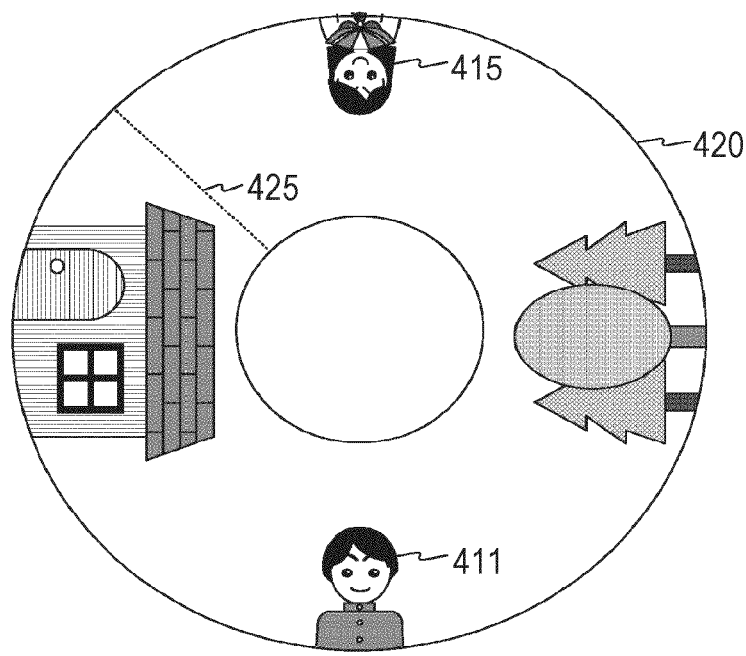
FIGS. 10A and 10B are diagrams illustrating a relationship between an imaging operation which is performed by using the imaging apparatus and the captured image which is generated by the imaging operation in the first embodiment of the present disclosure.

FIG. 10A illustrates the omnidirectional image 420 which is generated by the omnidirectional operation illustrated in FIGS. 9A and 9B. That is, the omnidirectional image 420 is the annular image in which the person 415 is disposed in the upper side and the person 411 is disposed in the lower side.

Figure 10B:
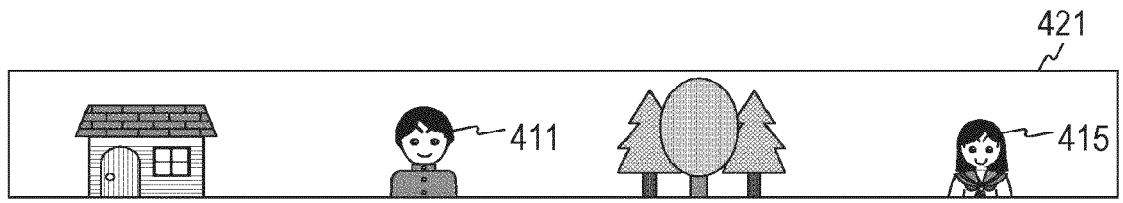

FIG. 10B illustrates a horizontally long image 421 in which the omnidirectional image 420 illustrated in FIG. 10A is cut by a dotted line 425 in a radial direction and deployed. That is, the horizontally long image 421 is a panorama image in which the person 411 and the person 415 are disposed in the positions corresponding to the omnidirectional image 420.

In addition, the plane image is generated in the case where the adaptor 200 is extracted from the imaging apparatus 100 in the state illustrated in FIGS. 9A and 9B. As the plane image, for example, a vertically long image in which the person 415 is disposed in the center is generated.

Here, in the case where the person 411 performs the imaging operation in the state illustrated in FIGS. 9A and 9B, the omnidirectional image 420 illustrated in FIG. 10A is displayed on the input and output panel 151. For example, it is assumed that the horizontally long image 421 along with the omnidirectional image 420 is displayed on the input and output panel 151. In this case, since the horizontal image 421 is long in the horizontal direction, it is considered that the horizontally long image 421 is reduced and displayed. However, in the case where the horizontally long image 421 is reduced and displayed, the subject included in the horizontally long image 421 is small, and it is also assumed that the detailed portion is difficult to view. Therefore, it is considered that the images in which the horizontally long image 421 is divided (that is, images in which the omnidirectional image 420 is divided and converted) are displayed. For example, it is considered that the omnidirectional image 420 is cut (that is, cut at positions of the persons 411 and 415, house, tree) to be divided into four (divided into four by the line in the horizontal direction and the line in the vertical direction) and each image is displayed. However, if the omnidirectional image is divided in this way, since the person 411 who is the photographer, the person 415 who is a main subject, and the like are cut and displayed, it is also assumed that it is difficult for the person 411 to view the displayed image. Therefore, in the first embodiment of the present disclosure, the following example is described. That is, a substantially fan-shaped object region is specified in the omnidirectional image 420 on the basis of a specified direction which is specified based on the attitude of the imaging apparatus 100 in the imaging position among all directions, and the image of the object region is converted into an approximately rectangular shaped image and displayed. In this case, the substantially fan-shaped object region is specified in the omnidirectional image 420 so that the specified direction is not cut in the omnidirectional image 420.

That is, in a case where the omnidirectional image which is distorted into a donut-shape is converted, it is necessary to correct the distortion. In this case, the region of 90° (the object region of the conversion image) in the omnidirectional image is specified, and the conversion with respect to the image of the object region can be performed. Here, for example, since the input and output panel 151 is positioned at the rear surface side of the imaging apparatus 100, there is a high probability of the photographer being positioned at the rear surface side of the imaging apparatus 100. In addition, in the imaging apparatus 100, the input and output 151 is linearly disposed with respect to the imaging direction (optical axis direction). Thereby, in the case where the photographer performs the imaging operation while holding the imaging apparatus 100 in the position which the photographer can directly view the input and output panel 151, it is important to generate the conversion image so that the positions of the photographer and the subject (main subject) which is positioned at the front of the photographer is not divided. For example, with the center as the front (optical axis direction) of the imaging apparatus 100, the region of 90° is specified in the omnidirectional image, and the regions for each 90° (four regions) can be specified. Thereby, the photographer himself or the subject of the front at the time of a normal imaging operation can be positioned at the center position in the displayed image.

In addition, in the case where the imaging operation is performed by using the imaging apparatus 100, a plurality of kinds of captured images can be recorded. For example, it is assumed that the person 411 performs the imaging operation which records plurality kinds of captured images while having the person 415 as the main subject. For example, it is also assumed that the imaging operation for recording the omnidirectional image 420 illustrated in FIG. 10A is performed after the imaging operation for recording a plane image is performed. In this case, the person 411 sets the plane image capturing mode while having the imaging apparatus 100 as the vertically long state without mounting the adaptor 200 firstly, and performs the imaging operation (for example, the moving image capturing operation). Subsequently, the person 411 mounts the adaptor 200, maintains the vertically long state of the imaging apparatus 100, sets the omnidirectional image capturing mode, and performs an imaging operation (for example, the moving image capturing operation).

However, it is also assumed that after the person 411 ends the imaging operation of the plane image, they perform only the mounting of the adaptor 200, and start the imaging operation in a state of forgetting the setting operation of the omnidirectional image capturing mode. In addition, it is also assumed that after the person 411 mounts the adaptor 200 they perform the omnidirectional imaging operation, set another imaging mode (for example, plane image capturing mode) in a state of forgetting the extraction of the adaptor 200, and start the imaging operation. In such a case, there is a concern that a suitable captured image may not be recorded. Therefore, in the first embodiment of the present disclosure, a suitable imaging mode is automatically set when the adaptor 200 is mounted.

Conversion Example from Entire Peripheral Image to Panorama Image

Figure 11A:
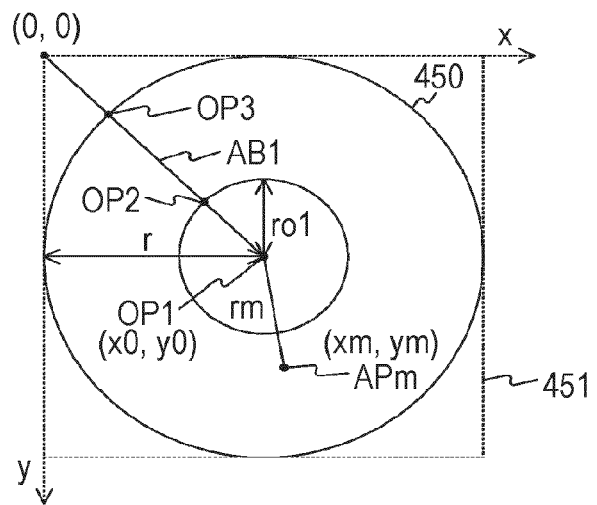
FIGS. 11A and 11B are diagrams illustrating a relationship between an omnidirectional image (annular image) which is an object to be converted by an image processing portion and a panorama image after the conversion in the first embodiment of the present disclosure.
Figure 11B:
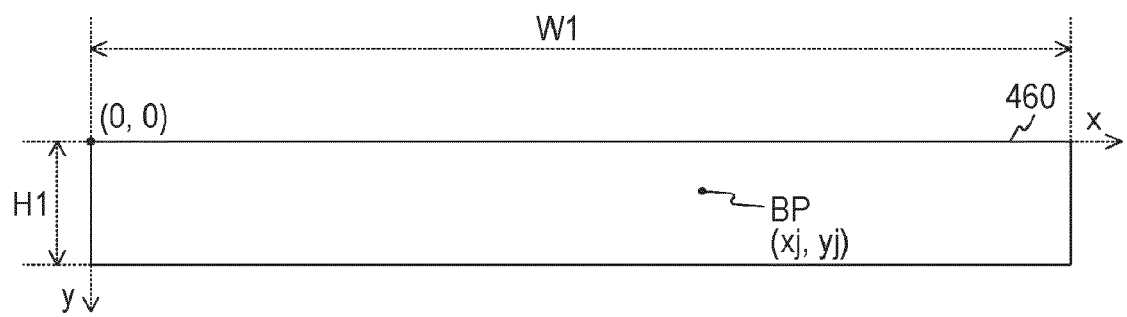

FIGS. 11A and 11B are diagrams illustrating a relationship between an omnidirectional image (annular image) which is an object to be converted by the image processing portion 171 and a panorama image after the conversion in the first embodiment of the present disclosure. FIG. 11A illustrates an omnidirectional image 450 which is generated by the imaging portion 110, and FIG. 11B illustrates a panorama image 460 in which the omnidirectional image 450 is converted and generated.

FIGS. 11A and 11B describe the following case as an example. That is, a left upper corner of a rectangle including the omnidirectional image 450 generated by the imaging portion 110 is given as the origin (0, 0), in x-y coordinates in which the horizontal axis is given as the X-axis and the vertical axis is given as the Y-axis, the omnidirectional image 450 is converted. In addition, FIGS. 11A and 11B describe the following example. That is, by corresponding the X-axis direction of the panorama image 460 to the circumstance direction of the omnidirectional image 450 and the Y-axis direction of the panorama image 460 to the radial direction of the omnidirectional image 450, the conversion processing is performed.

The central coordinates OP1 of a circle corresponding to the omnidirectional image 450 in illustrated in FIG. 11A are given as coordinates (x0, y0), and the radius of the circle corresponding to the omnidirectional image 450 is given as r. In addition, an intersection point between the inner radius (radius ro1) of the circle corresponding to the omnidirectional image 450 and a base line AB1 is given as coordinates OP2, and an intersection point between the outer radius (radius r) of the circle corresponding to the omnidirectional image 450 and the base line AB1 is given as coordinates OP3. In addition, the base line AB1 is a line which is a reference at the case of performing the conversion processing from the omnidirectional image to the panorama image, and the base line is a line in the radial direction of the circle corresponding to the omnidirectional image. Moreover, in FIG. 11(B), a length (pixel number) in the X-axis direction of the panorama image 460 is given as W1, and a length (pixel number) in the Y-axis direction is given as H1.

Here, coordinates APm (xm, ym) in the omnidirectional image 450 in illustrated in FIG. 11A can be obtained by the following equation 1.

$$\begin{bmatrix} xm \\ ym \end{bmatrix} = rm \begin{bmatrix} \cos\theta \\ \sin\theta \end{bmatrix} + \begin{bmatrix} x0 \\ y0 \end{bmatrix} \quad \text{Equation 1}$$

Here, rm is a value which indicates a distance from the central coordinates OP1 to the coordinates APm (xm, ym). Moreover, θ is a value which indicates an angle between a line segment which connects the central coordinates OP1 and the coordinates APm (xm, ym) and the base line AB1.

Here, in the case where the coordinates OP2 in the omnidirectional image 450 corresponds to a reference position (0,0) of the panorama image 460, variation (0 to W1) in the X-axis direction in the panorama image 460 corresponds variation (0 to 2πr) in the circumference direction in the omnidirectional image 450. Moreover, variation (0 to H1) in the Y-axis direction in the panorama image 460 corresponds to variation (ro1 to r) in the radial direction in the omnidirectional image 450. In addition, the following characteristic is provided. That is, in a case where the position on the X-axis is linearly changed from 0 to W1, the position in the circumference direction is linearly changed from 0 to 2πr. Moreover, the following characteristic is provided. That is, in a case where the position on the Y-axis is linearly changed from 0 to H1, the position in the radial direction is linearly changed from r01 to r.

In this case, a coordinate BP (xi, yj) in the panorama image 460 illustrated in FIG. 11B becomes a coordinate AP (rj, θj) in the omnidirectional image 450 by the following equations 2 and 3.

$$rj = (r - r01) \times (yj/H1) \quad \text{Equation 2}$$

$$\theta j = 2\pi r \times (xj/W1) \quad \text{Equation 3}$$

In this way, the coordinate AP (rj, θj) in the omnidirectional image 450 corresponding to the coordinate BPm (xj, yj) in the panorama image 460 after the conversion can be calculated. Thereby, the coordinate in the omnidirectional image 450 corresponding to each coordinate in the panorama image 460 is obtained, and the omnidirectional image 450 can be converted to the panorama image 460 by reading the image data of in the coordinate. Here, in a case where the obtained coordinate comes to be between pixels, the pixel data corresponding to the obtained coordinate is generated by performing interpolation processing or the like using the pixel data positioned at the periphery of the obtained coordinate. In addition, correction processes such a suitable distortion correction or the like are performed with respect to the generated image data.

Moreover, in FIGS. 11A and 11B, the conversion example in which the annular image is converted into the panorama image is described. However, a case where the circular image as the omnidirectional image is converted into the panorama image can be also similarly performed. In this way, in the case where the circular image is converted into the panorama image, for example, the conversion processing of the variation (0 to H1) in the Y-axis direction in the panorama image 460 is performed so as to correspond to the variation (0 to r) in the radial direction in the omnidirectional image 450. Moreover, the omnidirectional image may be converted into the panorama image by other conversion methods.

Modification of Omnidirectional Image

Figure 12A:
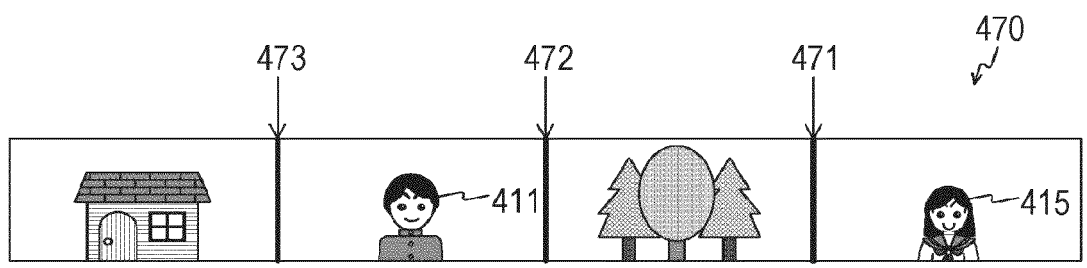
FIGS. 12A and 12B are diagrams illustrating a relationship between a panorama image which is an object to be converted by the image processing portion and a conversion image corresponding to the panorama image in the first embodiment of the present disclosure.
Figure 12B:
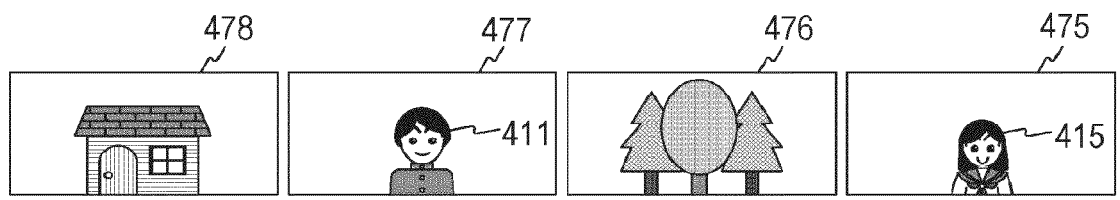

FIGS. 12A and 12B are diagrams illustrating a relationship between a panorama image which is an object to be converted by the image processing portion 171 and a conversion image corresponding to the panorama image in the first embodiment of the present disclosure.

Figure 13A:
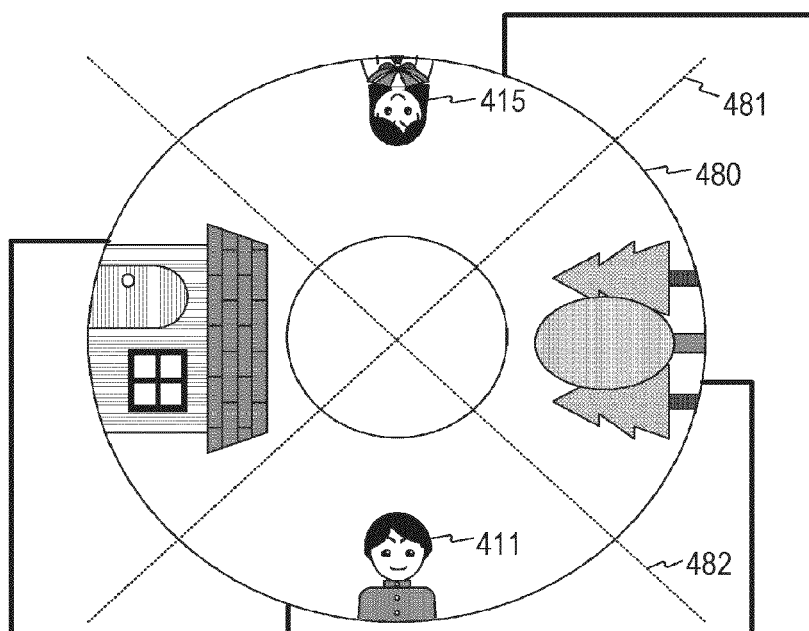
FIGS. 13A and 13B are diagrams illustrating a relationship between an omnidirectional image which is an object to be converted by the image processing portion and an image (conversion image) after the conversion in first embodiment of the present disclosure.
Figure 13B:
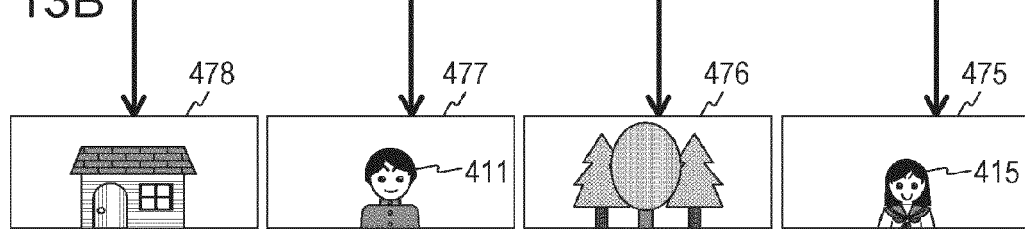

FIGS. 13A and 13B are diagrams illustrating a relationship between an omnidirectional image which is an object to be converted by the image processing portion 171 and an image (conversion image) after the conversion in first embodiment of the present disclosure.

FIG. 12A illustrates a panorama image 470 which is generated through the conversion processing by the image processing portion 171, and FIG. 12B illustrates conversion images 475 to 478 corresponding to the panorama image 470.

FIG. 13A illustrates an omnidirectional image 480 which is generated by the imaging portion 110. The omnidirectional image 450 is similar to that of FIG. 10A. In addition, FIG. 13B illustrates conversion images 475 to 478 in which the omnidirectional image 480 is divided and generated.

Through the conversion processing described above, the panorama image 470 is generated from the omnidirectional image 480. Here, since the panorama image 470 is an image which is longer in a specified direction (for example, a horizontal direction) than a normal image, when the entire panorama image 470 is displayed, a more reduced image than the other image is displayed. Thereby, the user may not view each portion in detail in the panorama image 470.

Therefore, the panorama image 470 is divided with division lines 471 to 473 illustrated in FIG. 12A as the boundary, and the divided conversion images 475 to 478 can be used as the display image. In this case, the image processing portion 171 generates the panorama image 470 from the omnidirectional image 480 through the above-described conversion processing, and the conversion images 475 to 478 can be generated by dividing the panorama image 470. In addition, as illustrated in FIGS. 13A and 13B, the conversion images 475 to 478 may be directly generated from the omnidirectional image 480.

Here, dotted lines 481 and 482 illustrated in FIG. 13A are lines corresponding to the division lines 471 to 473 illustrated in FIG. 12A. As described above, if the person 411 who is photographer and the person 415 who is the main subject or the like are cut, since it is assumed that it is difficult for the person 411 to view the display image, the first embodiment of the present disclosure is constituted so that the person 411 and the person 415 or the like are not cut. That is, the lines (dotted lines 481 and 482), in which the line in the horizontal direction and the line in the vertical direction are rotated to 45° respectively, become the boundaries. In addition, in the first embodiment of the present disclosure, the example in which the omnidirectional image is divided into four so that the persons 411 and 415 or the like are not cut is described. However, divisions other than the four-division may be applied. For example, division into two by the line in the horizontal direction may be performed. In this case, since the persons 411 and 415 which are the main subject are not cut even though the house or the tree in the omnidirectional image 480 is cut, it is assumed that the influence to which the person 411 is subjected is small.

In this way, the image processing portion 171 divides the circumferential direction of the omnidirectional image in plurality, the divided plurality of regions are specified as the object region, and the conversion image is generated in plurality. In addition, the image processing portion 171 generates the conversion image so that the position corresponding to the specified direction in the circumferential direction of the omnidirectional image is the specified position (for example, the center position in the horizontal direction) in the conversion image (substantially rectangular image).

Display Example of Omnidirectional Image and Conversion Image

Figure 14:
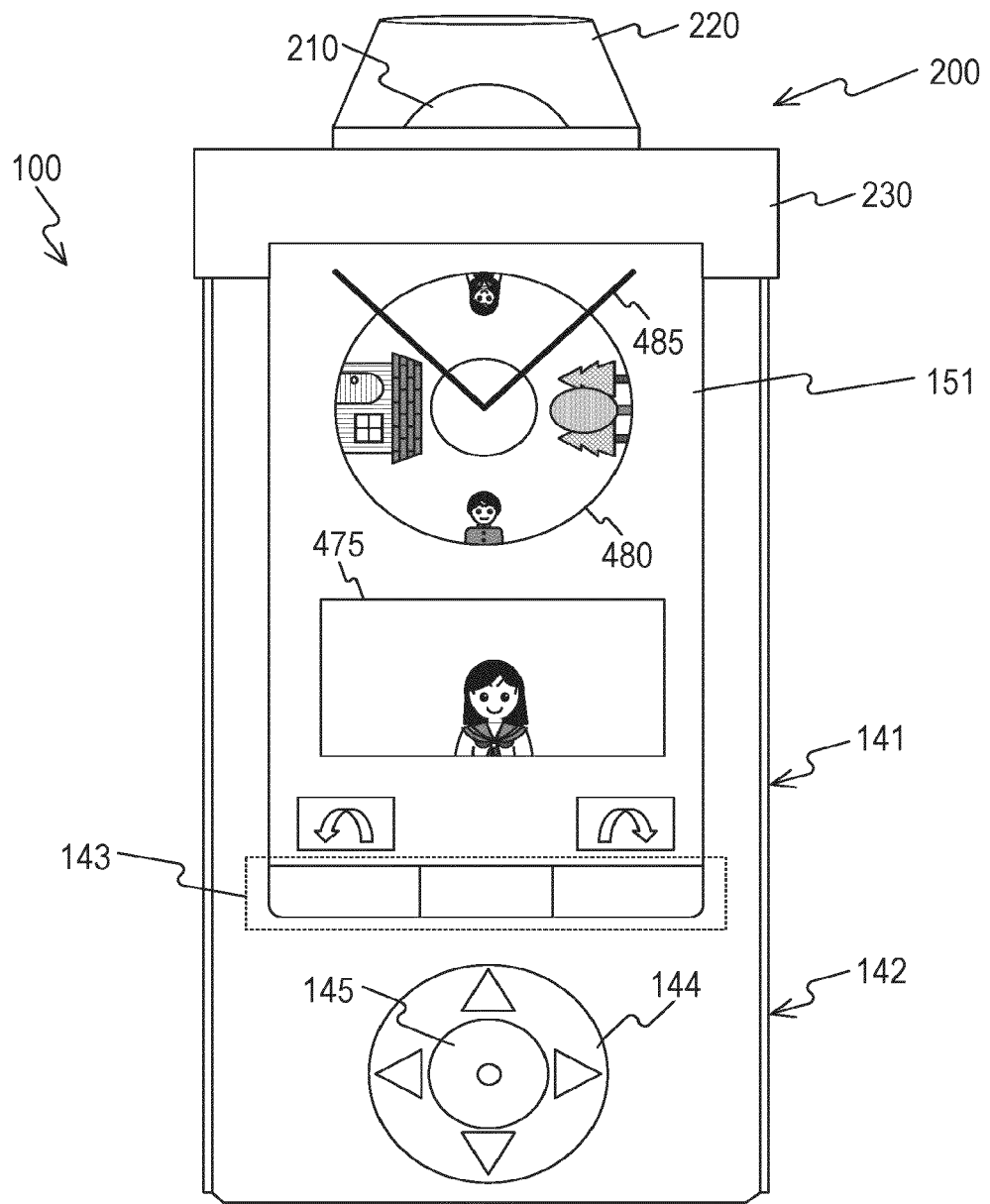
FIG. 14 is a diagram illustrating a display example of an omnidirectional image and a conversion image which are displayed on an input and output panel in the first embodiment of the present disclosure.

FIG. 14 is a diagram illustrating a display example of the omnidirectional image and the conversion image which are displayed on the input and output panel 151 in the first embodiment of the present disclosure. FIG. 14 illustrates an example which displays the omnidirectional image 480 and the conversion image 475 illustrated in FIGS. 12A to 13B.

For example, at the time of the imaging operation of the omnidirectional image using the imaging apparatus 100, the display control portion 175 displays the omnidirectional image 480 and the conversion image 475 on the input and output panel 151 as a through-image. In this case, a V-shaped icon 485, which displays the position corresponding to the conversion image 475, is overlapped and displayed on the omnidirectional image 480. As illustrated in 15, the V-shaped icon 485 is changed according to the switching in the case where the conversion image is switched by a switching operation.

Switching Example of Conversion Image

Figure 15:
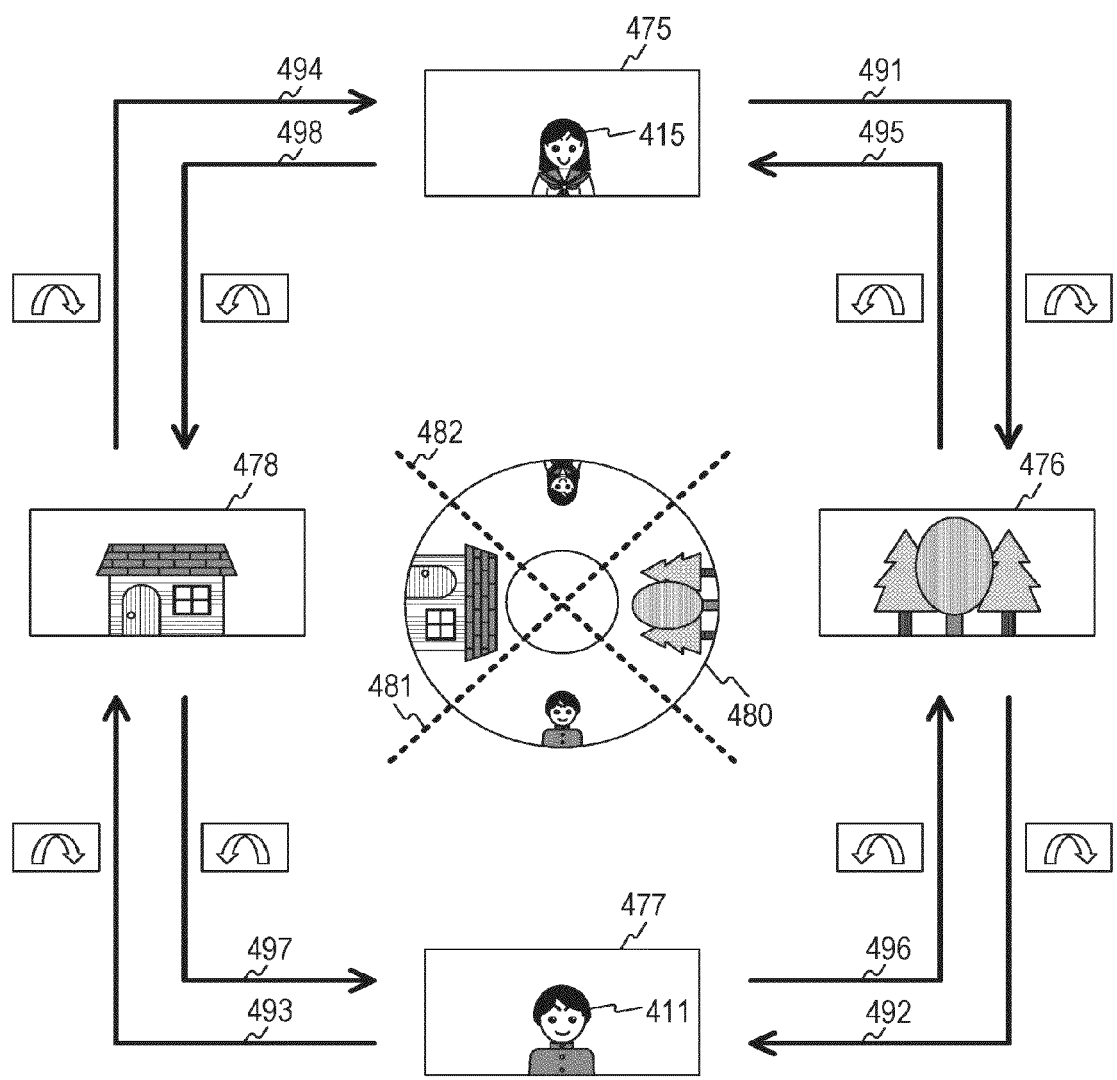
FIG. 15 is a diagram illustrating a switching example when switching a conversion image which is displayed on the input and output panel in the first embodiment of the present disclosure.

FIG. 15 is a diagram illustrating a switching example when switching the conversion image which is displayed on the input and output panel 151 in the first embodiment of the present disclosure. As illustrated in FIG. 14, FIG. 15 illustrates an example in which the switching is performed so as to be displayed to any one of the conversion image 475 to 478 based on the use operation in the case where the omnidirectional image 480 and the conversion image 475 are displayed as the through-image.

For example, due to the fact that one operating button (right end of operating button) from the operating button group 143 constituted by three operating buttons is used, the display condition of the conversion image 475 to 478 can be sequentially changed (illustrated in arrows 491 to 494). In addition, due to the fact that other operating buttons (left end of operating button) among the operating button group 143 are used, the display condition of the conversion images 475 to 478 can be sequentially changed (illustrated in arrows 495 to 498). In addition, the operating icons labeled at the upper side of the operating button group 143 illustrated in FIG. 14 correspond to the operating icons labeled in the vicinity of the arrows 491 to 498 illustrated in FIG. 15. In addition, dotted lines 481 and 482 indicate the positions, in which the V-shaped icons (V-shaped icon 485 illustrated in FIG. 14) can be displayed, on the omnidirectional image 480.

In this way, at the time of the imaging operation, the user can view an image (conversion image) of a portion of the panorama image which is generated by the conversion processing of the omnidirectional image along with the omnidirectional image. Thereby, the user can easily confirm a detailed portion of a region which the user desires in the omnidirectional image during the imaging operation. That is, according to the first embodiment of the present disclosure, the user can easily perceive the omnidirectional image which is generated by the omnidirectional imaging optical system 210.

In addition, FIGS. 14 and 15 illustrate an example in which the omnidirectional image and the conversion image are simultaneously displayed. However, for example, only the conversion image may be displayed based on the user operation. Moreover, when a recording operation is performed in the case where the imaging operation of the omnidirectional image is performed, only the omnidirectional image is recorded. However, the conversion image which is a display object along with the omnidirectional image may be associated and recorded (for example, recorded in the same file or a different file). In this case, for example, time information, synchronization information (information for synchronously displaying the omnidirectional image and the conversion image), or the like are included as an accompanying information so that the omnidirectional image and the conversion image are synchronously displayed.

Display Example of Omnidirectional Image and Conversion Image

Figure 16A:
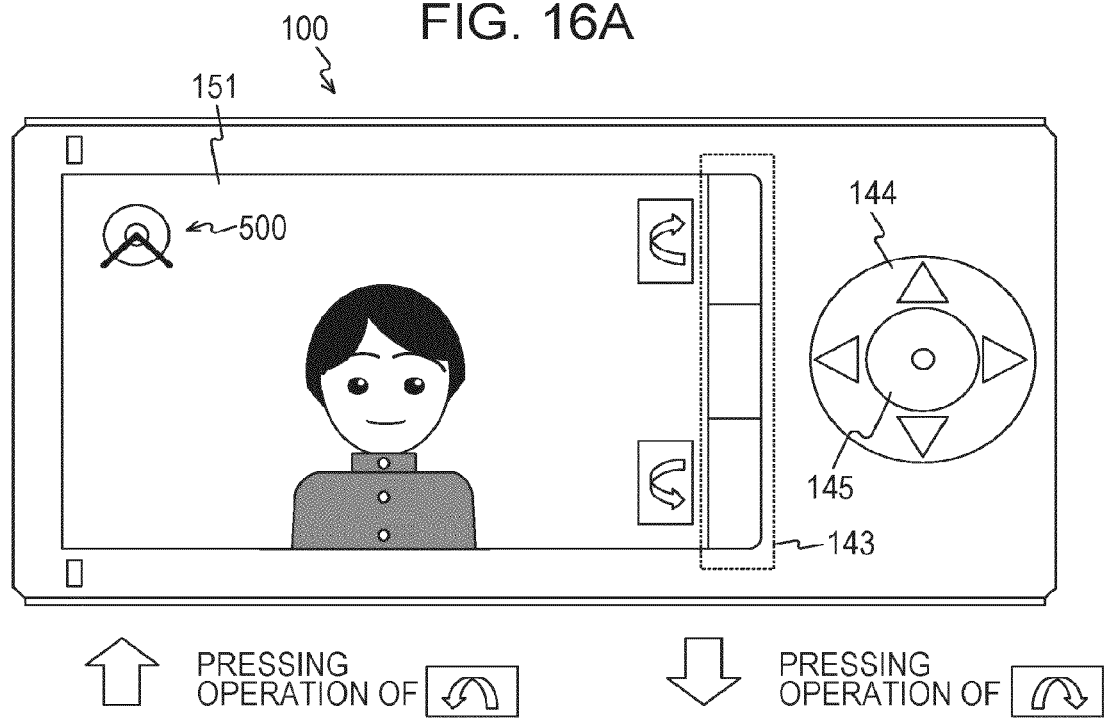
FIGS. 16A and 16B are diagrams illustrating a display example of an omnidirectional image and a conversion image which are displayed on the input and output panel in the first embodiment of the present disclosure.
Figure 16B:
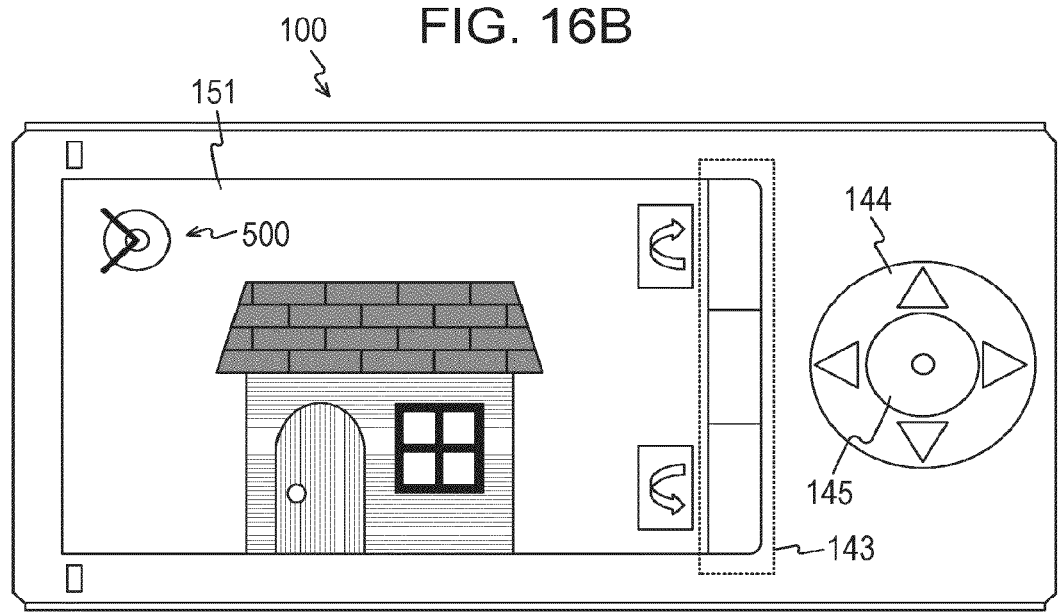

In the above, the example in which the omnidirectional image and the conversion image are simultaneously displayed during the imaging operation is described. With respect to omnidirectional image content items which are recorded by the imaging operation of the omnidirectional image, also at the time of reproduction, similarly, the omnidirectional image and the conversion image can be simultaneously or sequentially displayed. Moreover, since the example, in which the omnidirectional image and the conversion image are simultaneously and sequentially displayed, is substantially similar to that of FIGS. 14 and 15, here, the description is omitted. FIGS. 16A and 16B are display examples in which the conversion image is sequentially displayed.

FIGS. 16A and 16B are diagrams illustrating the display example of the omnidirectional image and the conversion image which are displayed on the input and output panel 151 in the first embodiment of the present disclosure. FIGS. 16A and 16B illustrate display examples of the input and output panel 151 in a case where the imaging apparatus 100 is in a horizontally long state (for example, the imaging apparatus 100 is rotated by 90° in the direction of the arrows 102 and 103 in FIGS. 1A and 1B). In addition, FIGS. 16A and 16B illustrate the examples which display the conversion image 477 and the conversion image 478 illustrated in FIGS. 12A to 13B. For example, firstly, the conversion image 475 illustrated in FIGS. 12A and 12B or the like is displayed on the input and output panel 151 in the horizontally long state. After the display, by performing the above-described switching operation, the order of the conversion images 476 to 478 can be switched. Through the switching operation, the conversion image 477 and the conversion image 478 can be displayed. In this case, a V-shaped icon 500 is displayed on the left upper of a display screen. Similarly to the V-shaped icon 485 illustrated in FIG. 14, the V-shaped icon 500 is an icon which displays the position corresponding to the displayed conversion image. Thereby, the user can easily perceive that the displayed conversion image corresponds to positions in the omnidirectional images. That is, the user can easily perceive the omnidirectional image which is generated by using the omnidirectional imaging optical system 210.

Operation Example of Imaging Apparatus

Next, operation of the imaging apparatus 100 in the first embodiment of the present disclosure will be described with reference to the drawings.

FIG. 17 is a flowchart illustrating an example of a processing step of an imaging operation control processing of the omnidirectional image which is performed by the imaging apparatus 100 in the first embodiment of the present disclosure. In the example, the adaptor 200 is mounted on the imaging apparatus 100, and the omnidirectional image capturing mode is set by the imaging mode setting portion 172. In addition, in the example, the moving image capturing operation is performed.

Firstly, whether or not the starting operation of the imaging operation is performed (step S901) is determined, and when the starting operation of the imaging operation is not performed, observation is continuously performed. When the starting operation of the imaging operation is performed (step S901), the imaging portion 110 performs the imaging processing and generates the omnidirectional image (annular image) (step S902). In addition, step S902 is an example of an acquiring step described in the claims.

Next, the image processing portion 171 specifies a substantially fan-shaped object region in the generated omnidirectional image, and the image of the object region is converted into a substantially rectangular image (conversion image) (step S903). In this case, the conversion image may be generated with the entire region in the omnidirectional image as the object region (for example, four regions), and the conversion image may be generated with only the region which is the display object in the omnidirectional image, as the object region (for example, single region). In addition, step S903 is an example of an image processing step described in the claims.

Next, the display control portion 175 simultaneously displays the conversion image and the omnidirectional image on the display portion 150 (step S904). In addition, step S904 is an example of a display control step described in the claims.

Next, the recording control portion 174 records the omnidirectional image on the recording medium 185 as a moving image file (step S905).

Next, whether or not the display switching operation of the conversion image displayed on the display portion 150 is performed (step S906) is determined, and when the display switching operation is not performed, the process proceeds to step S908. On the other hand, when the display switching operation is performed (step S906), the display control portion 175 changes the conversion image which is the display object and displays the conversion image on the display portion 150 (step S907). In this case, when the conversion images which are the display object are not generated, the conversion images are sequentially generated by the image processing portion 171.

Next, whether or not an ending operation of the imaging operation is performed (step S908) is determined, and when the ending operation of the imaging operation is not performed, the process returns to step S902. On the other hand, when the ending operation of the imaging operation is performed (step S908), the operation of the imaging operation control processing of the omnidirectional image ends.

2. Second Embodiment

In the first embodiment of the present disclosure, the omnidirectional image and the conversion image are displayed as a through-image during the imaging operation of the omnidirectional image. In addition, in the first embodiment, the omnidirectional image and the conversion image recorded by the imaging operation are reproduced by the imaging apparatus. Here, with respect to the omnidirectional image file (omnidirectional image content items) recorded by the imaging operation, it is assumed that the reproduction is performed by using other apparatus (image processing apparatus). Also in this case, the omnidirectional image and the conversion image can be displayed. Therefore, the second embodiment of the present disclosure illustrates an example which displays the omnidirectional image and the conversion image by the image processing apparatus.

Configuration Example of Image Processing Apparatus

Figure 18:
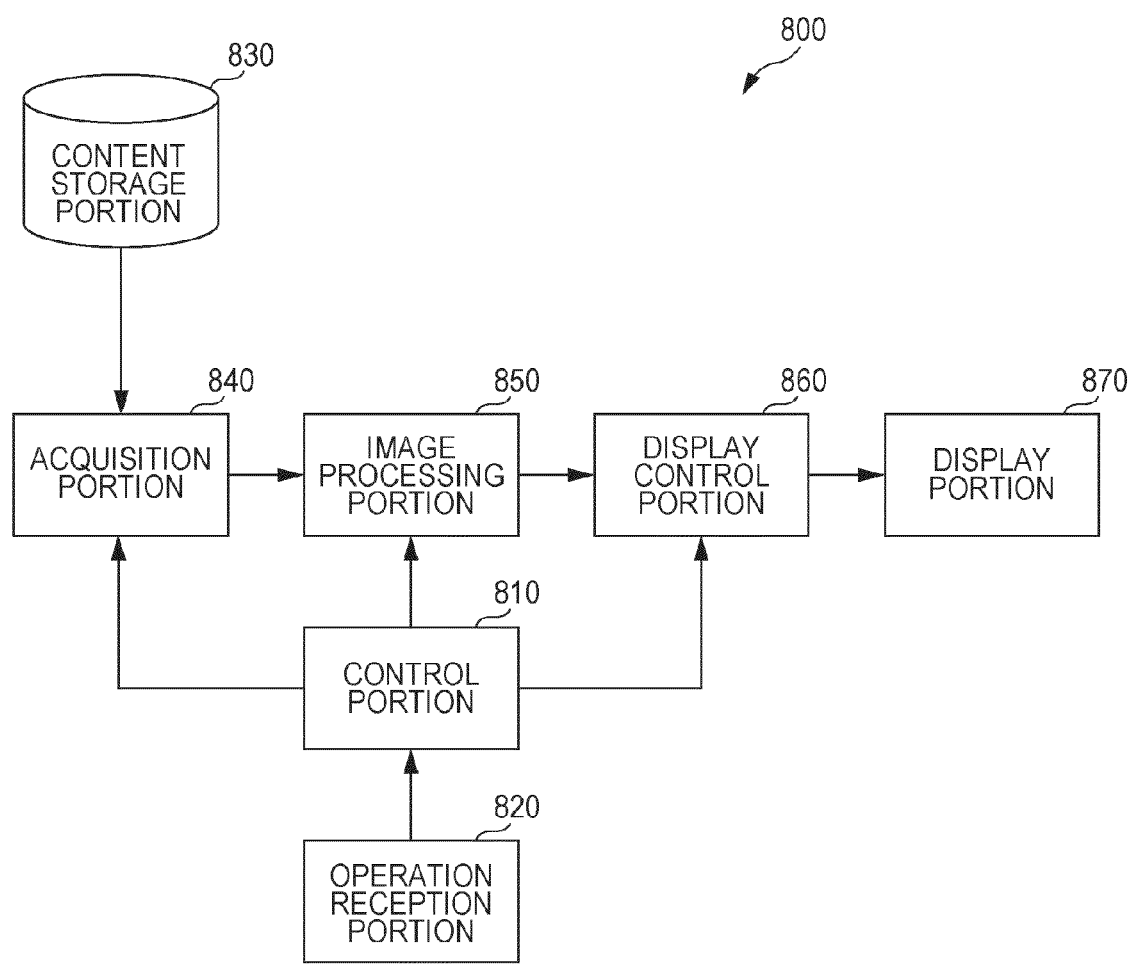
FIG. 18 is a block diagram illustrating a functional configuration example of an image processing apparatus in a second embodiment of the present disclosure.

FIG. 18 is a block diagram illustrating a functional configuration example of the image processing apparatus 800 in the second embodiment of the present disclosure. For example, an image processing apparatus 800 is realized by a television receiver (for example, a television receiver including a recording function) which receives broadcast waves from each broadcasting station and displays various images.

The image proceeding apparatus 800 includes a control portion 810, an operation reception portion 820, a content storage portion 830, an acquisition portion 840, an image processing portion 850, a display control portion 860, and a display portion 870. The second embodiment of the present disclosure describes an example which displays the omnidirectional image and the conversion image by using the omnidirectional image content items (image data (viewing data) and audio data) which is recorded by the imaging apparatus 100 in the first embodiment of the present disclosure. In addition, in FIG. 18, for ease of explanation, with respect to a speaker which outputs various audio information items or the like, the illustration and the explanation are omitted.

The control portion 810 controls each portion of the image processing apparatus 800 based on an operation input which can be received by the operation reception portion 820. For example, when the display instruction operation for displaying the omnidirectional image is received, the control portion 810 performs the control for displaying the omnidirectional image according to the display instruction operation on the display portion 870. Moreover, when the display instruction operation for displaying the omnidirectional image and the conversion image is received, the control portion 810 performs the control for displaying the omnidirectional image and the conversion image according to the display instruction operation on the display portion 870. In addition, when the switching operation which switches the conversion image displayed on the display portion 870 is received, the control portion 810 performs the control for switching the conversion image according to the switching operation.

The operation reception portion 820 is an operation reception portion which receives the operation input by user, and supplies the operation signal corresponding to the received operation input to the control portion 810.

The content storage portion 830 is a storage portion which stores various content items, and supplies the stored contents to the acquisition portion 840. For example, the content storage portion 830 stores content for displaying the omnidirectional image (omnidirectional image content). For example, the omnidirectional image content is recorded by the imaging apparatus 100, and recorded on the content storage portion 830 via the recording medium (memory card 180 or the like) or network.

The acquisition portion 840 acquires various information items which are stored in the content storage portion 830 based on the control of the control portion 810, and supplies the acquired information items to each portion. For example, when the acquisition portion 840 acquires the omnidirectional image content items from the content storage portion 830, the acquisition portion 840 supplies the omnidirectional image content items to the image processing portion 850.

The image processing portion 850 generates the conversion image (display object image) by using the omnidirectional image content items supplied from the acquisition portion 840 based on the control portion 810, and outputs the generated conversion image and omnidirectional image to the display control portion 860. That is, the image processing portion 850 specifies a substantially fan-shaped object region in the omnidirectional image on the basis of the direction specified based on the attitude of the imaging apparatus 100 in the imaging position among all directions, and converts the image of the object region into a substantially rectangular image. In addition, since the converted method of the image of the present embodiment is similar to that of the first embodiment of the present disclosure, here, detailed description is omitted.

The display control portion 860 performs the display processing for displaying the content items which are stored on the content storage portion 830 according to the operation input received by the operation reception portion 820. For example, when the display instruction operation for displaying the omnidirectional image is received, the display control portion 860 displays the omnidirectional image according to the display instruction operation on the display portion 870. Moreover, when the display instruction operation for displaying the omnidirectional image and the conversion image is received, the display control portion 860 simultaneously displays the omnidirectional image and the conversion image according to the display instruction operation on the display portion 870. In addition, when the switching operation which switches the conversion image displayed on the display portion 870 is received, the display control portion 860 switches the conversion image according to the switching operation.

The display portion 870 is a display portion which displays various images based on the control of the display control portion 860. For example, the display portion 870 can be realized by a display element such as an LCD (liquid Crystal Display). In addition, for example, a display portion having a relatively wide display screen can be used as the display portion 870.

Display Example of Omnidirectional Image and Conversion Image

Figure 19A:
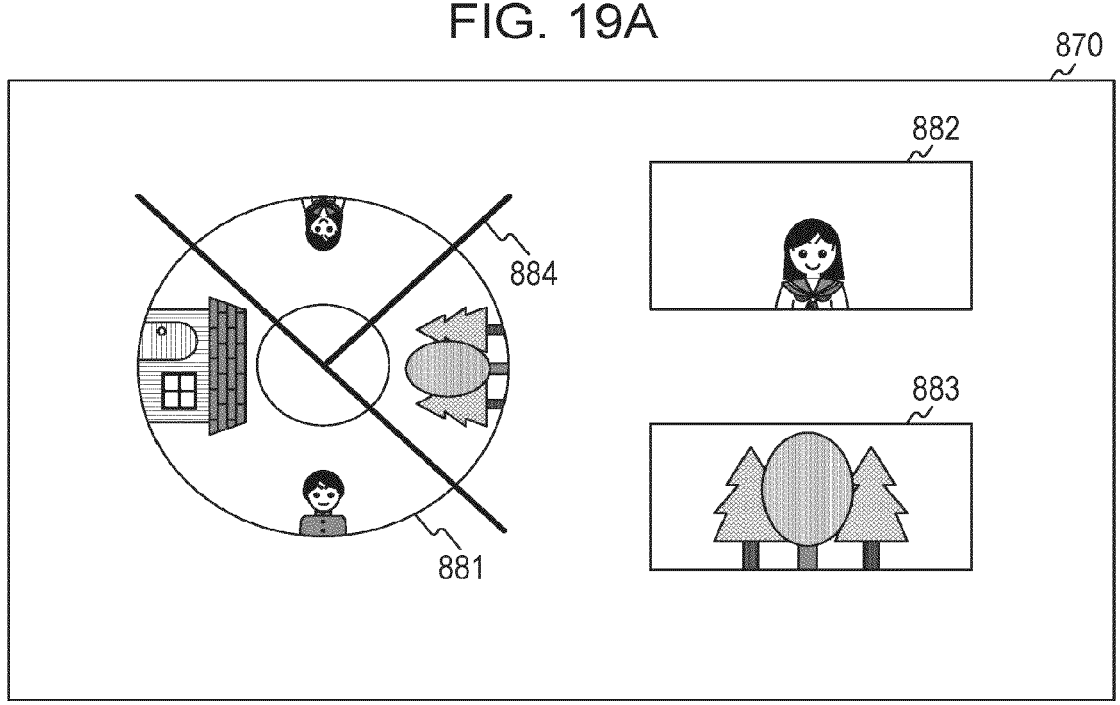
FIGS. 19A and 19B are diagrams illustrating a display example of an omnidirectional image and a conversion image which are displayed on a display portion in the second embodiment of the present disclosure.
Figure 19B:
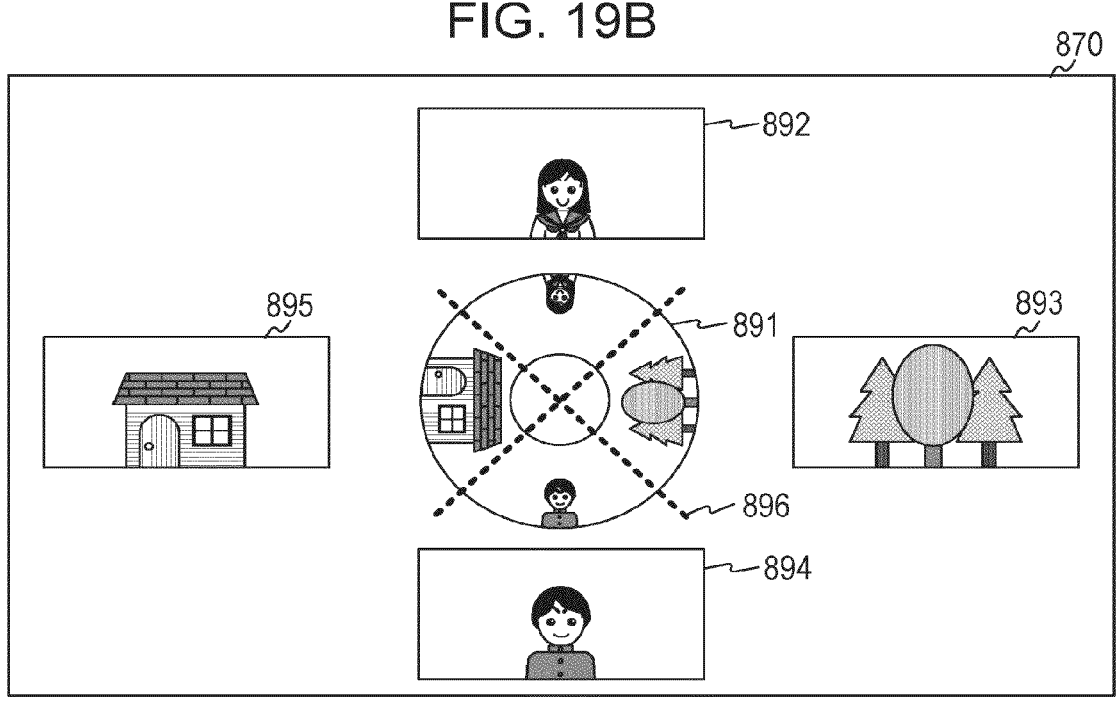

FIGS. 19A and 19B are block diagrams illustrating a display example of the omnidirectional image and the conversion image which are displayed on the display portion 870 in the second embodiment of the present disclosure.

FIG. 19A illustrates an example which displays two conversion images 882 and 883 along with the omnidirectional image 881 on the display portion 870. In addition, a T-shaped icon 884, which indicates the position in the omnidirectional image 881 corresponding to the displayed conversion images 882 and 883, is disposed on the omnidirectional image 881 and displayed.

FIG. 19B illustrates an example which displays four conversion images 892 to 895 along with the omnidirectional image 891 on the display portion 870. In addition, In addition, an X-shaped icon 896, which indicates the position in the omnidirectional image 891 corresponding to the displayed conversion images 892 to 895, is disposed on the omnidirectional image 891 and displayed.

In addition, the omnidirectional images 881 and 891 illustrated in FIGS. 19A and 19B are the same as the omnidirectional image 480 illustrated in FIG. 13A or the like, and the conversion images 882, 883, 892 to 895 illustrated in FIGS. 19A and 19B are the same as the conversion images 475 to 478 illustrated in FIG. 13B or the like.

Moreover, the display example illustrated in FIGS. 19A and 19B is an example, and the omnidirectional image and the conversion image may be displayed in other arrangements. In addition, the disposition of the omnidirectional image and the conversion image may be appropriately changed based on user operation.

In this way, when the omnidirectional image content items is reproduced by using the image processing apparatus 800 including the display portion 870 having a relatively wide display screen, the user can easily view the content items even though a relatively large number of conversion images are displayed along with the omnidirectional image content items. Thereby, the conversion images can be displayed in various arrangements along with the omnidirectional image according to user preference. Therefore, the user can easily perceive the omnidirectional image which is generated using the omnidirectional imaging optical system.

Moreover, the embodiments of the present disclosure can be applied to imaging apparatuses (for example, an electronic apparatus having an imaging function) such as a portable phone, a navigation system, and a portable media player capable of displaying various images. In addition, the embodiments of the present disclosure can be applied to image processing apparatuses such as a DVD reproduction apparatus which outputs image data to an external display device and displays various images on the display device.

Moreover, the embodiments of the present disclosure describe an example in which the annular image is generated as the omnidirectional image and displayed. However, the embodiments of the present disclosure can also be applied to a case where a circular image is generated as the omnidirectional image and displayed.

In addition, the embodiments of the present disclosure are examples for specifying the present disclosure, as described in the embodiments of the present disclosure, the matters of the embodiments of the present disclosure and the specified matters in the claims have a corresponding relationship to each other. Similarly, the specified matters in the claims and the matters denoted by the same terms in the embodiments of the present disclosure have a corresponding relationship to each other However, the present disclosure is not limited to the embodiments and can be specified by performing various modifications with respect to the embodiments within a range without departing gist of the present disclosure.

In addition, the processing steps described in the embodiments of the present disclosure may be understood as a method having a series of steps and as programs for performing a series of steps in computer or on a recording medium which stores the programs. As the recording medium, for example, a CD (Compact Disc), a MD (Mini Disc), a DVD (Digital Versatile Disc), a memory card, Blu-ray Disc (registered trademark), or the like can be used.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
an imaging portion that images an omnidirectional subject on the basis of an imaging position when imaging is performed and generates a circular image including the omnidirectional subject;
an image processing portion that specifies a substantially fan-shaped object region in a circular image which is generated on the basis of a direction specified based on an attitude of an imaging apparatus in the imaging position among all directions and converts an image of the object region into a substantially rectangular image; and
a display control portion that simultaneously displays a conversion image which is the converted image and the generated circular image on a display portion,
in which in specifying the object region and converting the image of the object region the image processing portion (i) divides the generated circular image in a circumferential direction into four divided regions by use of first and second cutting lines in which the first cutting line corresponds to the specified direction and the second cutting line corresponds to a perpendicular direction thereto and in which the first and second cutting lines are rotated 45 degrees and in which the generated circular image is divided along the rotated first and second cutting lines so as to obtain four equally divided regions as the four divided regions, (ii) specifies the four divided regions as four object regions, and (iii) converts each respective image of the four object regions into a respective substantially rectangular conversion image.

2. The imaging apparatus according to claim 1,
wherein the imaging portion generates the circular image in a state where an adaptor, which includes an omnidirectional imaging optical system for imaging the omnidirectional subject including a subject in an optical axis direction, is mounted, and
the image processing portion includes the optical axis direction as the specified direction on the basis of the imaging position.

3. The imaging apparatus according to claim 2,
wherein the imaging apparatus further includes the display portion,
the optical axis direction approximately coincides with a direction perpendicular to a display surface in the display portion, and
the imaging portion generates the circular image that includes a subject in the optical axis direction and a subject facing the display surface in a state where the adaptor is mounted.

4. The imaging apparatus according to claim 3,
wherein the subject in the optical axis direction and the subject facing the display surface each are a center position in a respective one of the conversion images.

5. The imaging apparatus according to claim 1,
wherein the display control portion displays each said conversion image and the generated circular image on the display portion at the time of performing the imaging operation of the circular image.

6. The imaging apparatus according to claim 1, further comprising:
an operation reception portion that receives a switching operation switching a display state in the display portion,
the display control portion switches a respective conversion image, which is displayed on the display portion according to a switching operation when receiving the switching operation, to another conversion image.

7. The imaging apparatus according to claim 1,
wherein the imaging portion generates an image, in which an image including the omnidirectional subject is annularly disposed, as the circular image.

8. An imaging apparatus comprising:
an acquisition portion that images an omnidirectional subject on the basis of an imaging position when an imaging of an imaging apparatus is performed and acquires a circular image including the generated omnidirectional subject; and
an image processing portion that divides the acquired circular image in a circumferential direction into four divided regions each a substantially fan-shaped object region in the acquired circular image on the basis of a direction specified based on an attitude of the imaging apparatus in the imaging position among all directions, converts each respective image of the four object regions into a respective substantially rectangular conversion image, and includes the images as display object images,
in which the dividing by the image processing portion includes using first and second cutting lines in which the first cutting line corresponds to the specified direction and the second cutting line corresponds to a perpendicular direction thereto and in which the first and second cutting lines are rotated 45 degrees and in which the acquired circular image is divided along the rotated first and second cutting lines so as to obtain four equally divided regions as the four divided regions.

9. An image processing method comprising:

imaging an omnidirectional subject on the basis of an imaging position when performing an imaging of an imaging apparatus and acquiring a circular image including the generated omnidirectional subject;

dividing the acquired circular image in a circumferential direction into four divided regions each a substantially fan-shaped object region in the acquired circular image on the basis of a direction specified based on an attitude of the imaging apparatus in the imaging position among all directions and converting each respective image of the four object regions into a respective substantially rectangular conversion image, in which the dividing includes using first and second cutting lines in which the first cutting line corresponds to the specified direction and the second cutting line corresponds to a perpendicular direction thereto and in which the first and second cutting lines are rotated 45 degrees and in which the acquired circular image is divided along the rotated first and second cutting lines so as to obtain four equally divided regions as the four divided regions; and displaying the converted images and the acquired circular image on a display portion simultaneously.

10. A non-transitory computer readable recording medium having stored thereon a program causing a computer to execute the following steps by computer, the steps comprising:

imaging an omnidirectional subject on the basis of an imaging position when performing an imaging of an imaging apparatus and acquiring a circular image including the generated omnidirectional subject;

dividing the acquired circular image in a circumferential direction into four divided regions each a substantially fan-shaped object region in the acquired circular image on the basis of a direction specified based on an attitude of the imaging apparatus in the imaging position among all directions and converting each respective image of the four object regions into a respective substantially rectangular conversion image, in which the dividing includes using first and second cutting lines in which the first cutting line corresponds to the specified direction and the second cutting line corresponds to a perpendicular direction thereto and in which the first and second cutting lines are rotated 45 degrees and in which the acquired circular image is divided along the rotated first and second cutting lines so as to obtain four equally divided regions as the four divided regions; and a displaying the converted images and the acquired circular image on a display portion simultaneously.

* * * * *